(12) United States Patent
Kim et al.

(10) Patent No.: US 12,236,572 B2
(45) Date of Patent: Feb. 25, 2025

(54) INSPECTION SYSTEM FOR INSPECTING DISPLAY DEVICE, DISPLAY DEVICE FOR COMPENSATING FOR DEFECTIVE PIXEL AND DEFECTIVE PIXEL COMPENSATION METHOD

(71) Applicant: Samsung Display Co., Ltd., Yongin-si (KR)

(72) Inventors: Mingyu Kim, Yongin-si (KR); Seyun Kim, Yongin-si (KR); Seungho Park, Yongin-si (KR); Hyungwoo Yim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/596,017

(22) Filed: Mar. 5, 2024

(65) Prior Publication Data

US 2024/0362766 A1 Oct. 31, 2024

(30) Foreign Application Priority Data

Apr. 28, 2023 (KR) .......................... 10-2023-0056014
Jul. 12, 2023 (KR) .......................... 10-2023-0090547

(51) Int. Cl.
 *G06T 7/00* (2017.01)
 *G09G 3/20* (2006.01)

(52) U.S. Cl.
 CPC ............. *G06T 7/0004* (2013.01); *G09G 3/20* (2013.01); *G06T 2207/30108* (2013.01); *G09G 2320/0233* (2013.01); *G09G 2330/10* (2013.01)

(58) Field of Classification Search
 CPC ........ G06T 7/0004; G06T 2207/30108; G09G 3/20; G09G 2320/0233; G09G 2330/10
 See application file for complete search history.

(56) References Cited

U.S. PATENT DOCUMENTS

| | | | |
|---|---|---|---|
| 11,373,573 | B2 | 6/2022 | Park |
| 11,404,026 | B2 | 8/2022 | Kim et al. |

(Continued)

FOREIGN PATENT DOCUMENTS

| | | |
|---|---|---|
| KR | 10-1108171 B1 | 1/2012 |
| KR | 10-2021-0122607 A | 10/2021 |
| KR | 10-2543039 B1 | 6/2023 |

*Primary Examiner* — Michael Pervan
(74) *Attorney, Agent, or Firm* — Womble Bond Dickinson (US) LLP

(57) ABSTRACT

An inspection system for inspecting a display device including pixels includes a camera for capturing the display device and providing a sensing image signal and an inspection device for receiving the sensing image signal and outputting a compensation signal for compensating for luminance of a defective pixel. The inspection device includes an image detector outputting a sensing input signal corresponding to the sensing image signal, a defect coordinate detector detecting the defective pixel based on the sensing input signal and outputting defect coordinates indicating a position of the defective pixel, an image analyzer analyzing consistency of the defect coordinates based on the sensing image signal and the sensing input signal and outputting final coordinates, and a defect compensation calculator outputting a compensation signal for adjusting luminance of compensation pixels adjacent to the defective pixel from among the pixels based on the final coordinates.

21 Claims, 20 Drawing Sheets

(56) References Cited

U.S. PATENT DOCUMENTS

| | | |
|---|---|---|
| 2006/0164407 A1 | 7/2006 | Cok |
| 2007/0257866 A1 | 11/2007 | Cok |
| 2008/0238936 A1 | 10/2008 | Kim |
| 2011/0227958 A1 | 9/2011 | Park et al. |
| 2013/0147858 A1 | 6/2013 | Omoto |
| 2015/0154933 A1 | 6/2015 | Bae et al. |
| 2017/0278232 A1* | 9/2017 | Parsons ................ G06T 7/0004 |

* cited by examiner

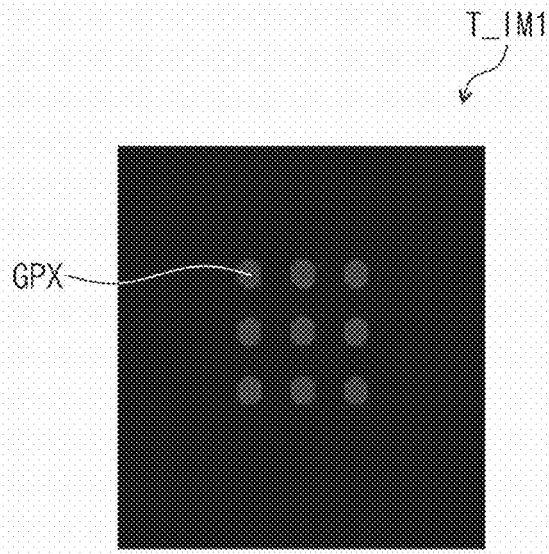

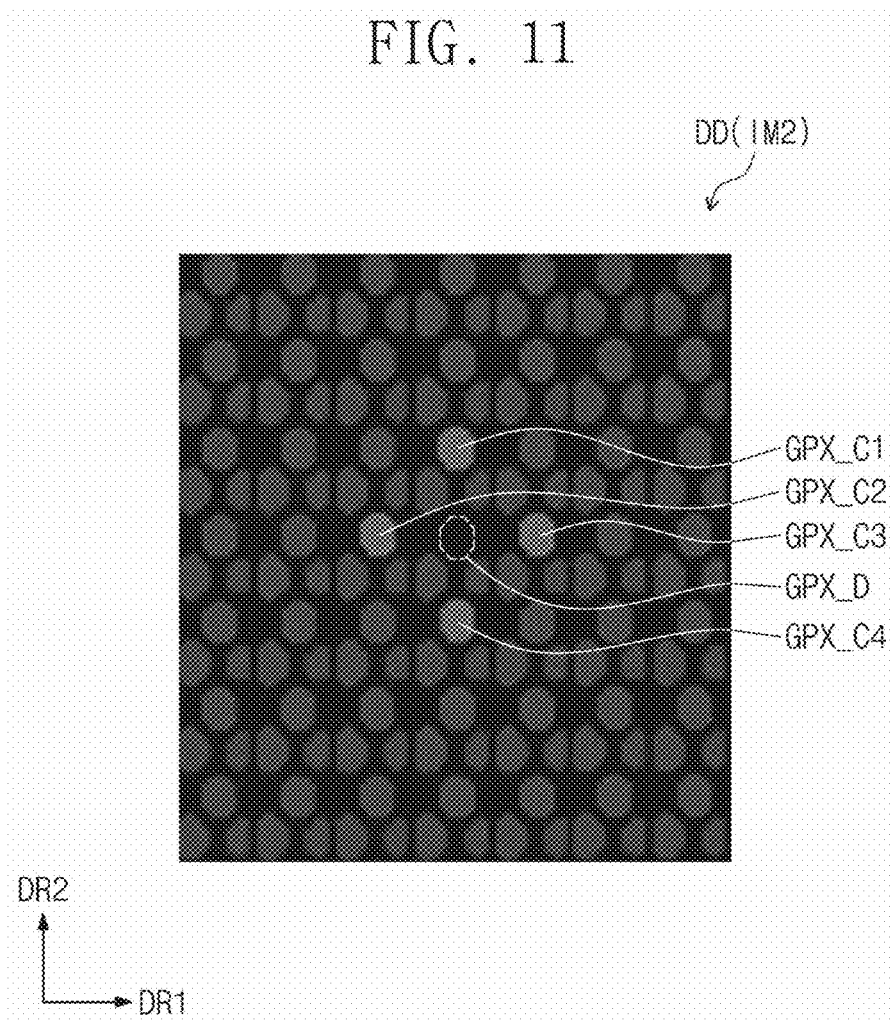

INSPECTION SYSTEM FOR INSPECTING DISPLAY DEVICE, DISPLAY DEVICE FOR COMPENSATING FOR DEFECTIVE PIXEL AND DEFECTIVE PIXEL COMPENSATION METHOD

CROSS-REFERENCE TO RELATED APPLICATIONS

The present application claims priority to and the benefit of Korean Patent Application Nos. 10-2023-0056014, filed in the Korean Intellectual Property Office on Apr. 28, 2023, and 10-2023-0090547, filed in the Korean Intellectual Property Office on Jul. 12, 2023, the entire disclosures of both of which are incorporated herein by reference.

BACKGROUND

1, Field

Aspects of embodiments of the present disclosure relate to a display device and a system for inspecting the display device.

2. Description of the Related Art

A multimedia electronic device, such as a television (TV), a mobile phone, a tablet computer, a navigation system, or a handheld game console, includes a display device for displaying an image. The display device includes a plurality of pixels for displaying an image.

Even though the plurality of pixels are formed by using the same process, due to process deviations, the plurality of pixels may have different characteristics from each other. Also, some of the plurality of pixels may be defective.

SUMMARY

Embodiments of the present disclosure provide an inspection system for testing whether or not pixels in a display device are defective.

Embodiments of the present disclosure also provide a display device and a compensation method for compensating for a defective pixel.

According to an embodiment, an inspection system includes a camera that captures a display device including a plurality of pixels and provides a sensing image signal and an inspection device that receives the sensing image signal and outputs a compensation signal for compensating for luminance of a defective pixel from among the plurality of pixels. The inspection device may include an image detector that outputs a sensing input signal corresponding to the sensing image signal, a defect coordinate detector that detects the defective pixel based on the sensing input signal and outputs defect coordinates indicating a position of the defective pixel, an image analyzer that analyzes consistency of the defect coordinates based on the sensing image signal and the sensing input signal and outputs final coordinates, and a defect compensation calculator that outputs a compensation signal for adjusting luminance of compensation pixels adjacent to the defective pixel from among the plurality of pixels based on the final coordinates.

The compensation pixels may include at least two pixels adjacent to the defective pixel in a first direction from among the plurality of pixels and at least two pixels adjacent to the defective pixel in a second direction from among the plurality of pixels. The first direction and the second direction may cross each other.

The compensation pixels may be selected from pixels emitting the same color light as the defective pixel from among the plurality of pixels.

The image analyzer may include a first maxima filter that performs maxima filtering on the sensing input signal and outputs a first filtering signal, a first minima filter that performs minima filtering on the first filtering signal and outputs a second filtering signal, an average calculator that calculates an average of the sensing input signal based on the second filtering signal, a background remover that removes a background image from the sensing input signal based on the average and outputs calculated defect coordinates, and a final coordinate output unit that outputs either the defect coordinates provided from the defect coordinate detector or the calculated defect coordinates as the final coordinates.

The inspection system may further include a second minima filter that performs the minima filtering on the sensing input signal and outputs a third filtering signal and a second maxima filter that performs the maxima filtering on the third filtering signal and outputs a fourth filtering signal, and the average calculator may calculate the average of the sensing input signal based on the second filtering signal and the fourth filtering signal.

The background remover may calculate a standard deviation based on a difference value between the sensing input signal and the average, may set a reference value based on the standard deviation, and, when the difference value of the sensing input signal and the average is greater than the reference value, may output coordinates of a pixel corresponding to the sensing input signal as the calculated defect coordinates.

In response to the defect coordinates provided from the defect coordinate detector being equal to the calculated defect coordinates, the final coordinate output unit may output the defect coordinates as the final coordinates.

In response to the defect coordinates provided from the defect coordinate detector being different from the calculated defect coordinates, the final coordinate output unit may output the calculated defect coordinates as the final coordinates.

The compensation signal may include a signal for increasing the luminance of the compensation pixels.

According to an embodiment, a display device includes a display panel that includes a plurality of pixels connected to a plurality of data lines and a plurality of scan lines, a data driving circuit that receives an image data signal and drives the plurality of data lines, a scan driving circuit that drives the plurality of scan lines, a memory that stores a compensation signal for compensation pixels adjacent to a defective pixel from among the plurality of pixels, and a driving controller that receives a control signal and an input image signal and controls the data driving circuit and the scan driving circuit such that an image is displayed in the display panel. The driving controller performs luminance adjustment on the input image signal corresponding to the compensation pixels based on the compensation signal and outputs the image data signal. The driving controller detects a pattern of the input image signal. The driving controller skips the luminance adjustment associated with at least some of the compensation pixels when the pattern is a preset pattern.

The driving controller may include a pattern detector that detects the pattern of the input image signal and outputs a pattern signal and a compensation unit that performs the luminance adjustment on the compensation pixels based on the pattern signal and the compensation signal and outputs the image data signal.

In response to the input image signal corresponding to the defective pixel being of a present (or given) grayscale, the driving controller may skip the luminance adjustment with regard to all the compensation pixels.

In response to the input image signal corresponding to at least one of the compensation pixels being of a present (or given) grayscale, the driving controller may skip the luminance adjustment with regard to the at least one of the compensation pixels.

The plurality of pixels may include a plurality of pixels for emitting different color lights. When the defective pixel emits a first light, the compensation pixels may be adjacent pixels to the defective pixel among pixels emitting the first light from among the plurality of pixels.

According to an embodiment, a defective pixel compensation method of a display device includes capturing the display device including a plurality of pixels to provide a sensing image signal, outputting a sensing input signal corresponding to the sensing image signal, detecting a defective pixel from among the plurality of pixels based on the sensing input signal and outputting defect coordinates indicating a position of the defective pixel, analyzing consistency of the defect coordinates based on the sensing image signal and the sensing input signal to output final coordinates, storing a compensation signal for increasing luminance of compensation pixels adjacent to the defective pixel from among the plurality of pixels based on the final coordinates in a memory of the display device, and performing luminance adjustment on an input image signal corresponding to the compensation pixels based on the compensation signal stored in the memory to output an image data signal.

The compensation pixels may include at least two pixels adjacent to the defective pixel in a first direction from among the plurality of pixels and at least two pixels adjacent to the defective pixel in a second direction from among the plurality of pixels. The first direction and the second direction may cross each other.

The compensation pixels may be selected from pixels emitting the same color light as the defective pixel from among the plurality of pixels.

The analyzing of the consistency of the defect coordinates based on the sensing image signal and the sensing input signal to output the final coordinates may include performing maxima filtering on the sensing input signal to output a first filtering signal, performing minima filtering on the first filtering signal to output a second filtering signal, calculating an average of the sensing input signal based on the second filtering signal, removing a background image from the sensing input signal based on the average to output calculated defect coordinates, and outputting either the defect coordinates or the calculated defect coordinates as the final coordinates.

The outputting of either the defect coordinates or the calculated defect coordinates as the final coordinates may include outputting the calculated defect coordinates as the final coordinates in response to the defect coordinates being different from the calculated defect coordinates.

The performing of the luminance adjustment on the input image signal corresponding to the compensation pixels based on the compensation signal stored in the memory to output the image data signal may include skipping the luminance adjustment with regard to all the compensation pixels in response to the input image signal corresponding to the defective pixel being of a preset (or given) grayscale.

The performing of the luminance adjustment on the input image signal corresponding to the compensation pixels based on the compensation signal stored in the memory to output the image data signal may include skipping the luminance adjustment with regard to the at least one of the compensation pixels in response to the input image signal corresponding to at least one of the compensation pixels being of a present (or given) grayscale.

BRIEF DESCRIPTION OF THE DRAWINGS

The above and other aspects and features of the present disclosure will become apparent by describing, in detail, embodiments thereof with reference to the accompanying drawings, in which:

FIG. 6A is an illustration of an inspection image.

FIG. 6B is an illustration of a first filter used by an image analyzer.

FIG. 11 is an enlarged view of a portion of the display device shown in FIG. 10.

DETAILED DESCRIPTION

Figure 1:
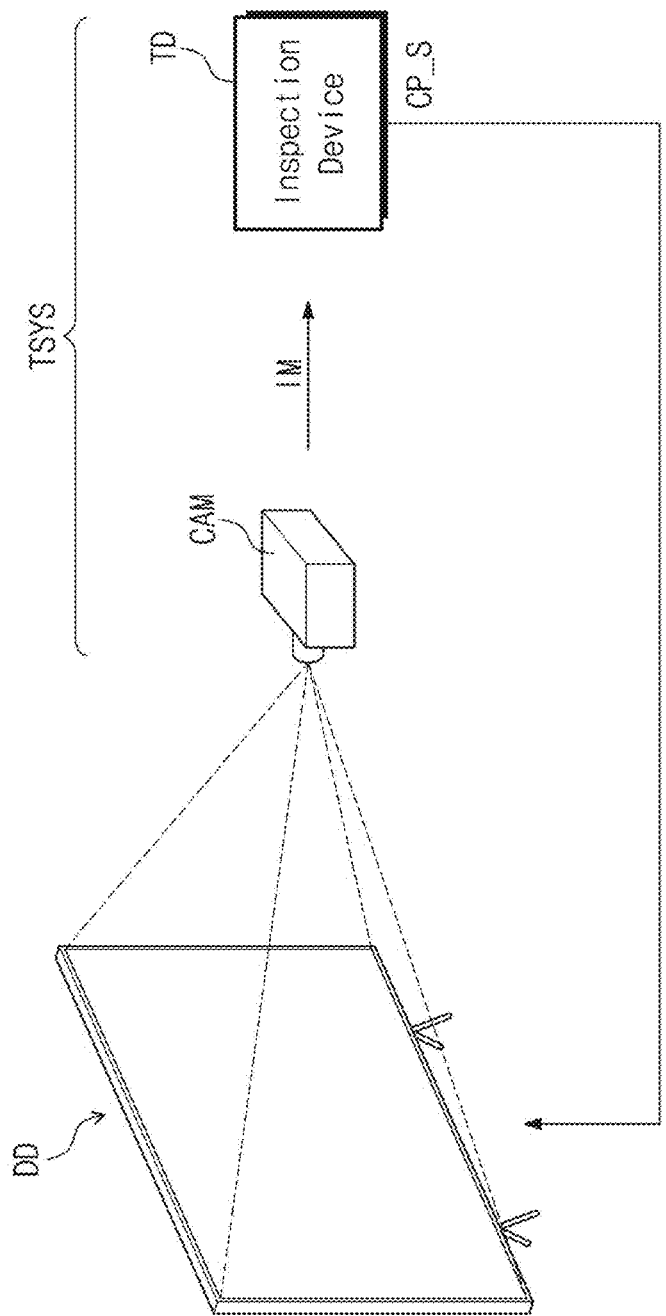
FIG. 1 is a diagram illustrating an inspection system testing a display panel according to an embodiment of the present disclosure.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Unless otherwise defined, all terms (including technical terms and scientific terms) used in this specification have the same meaning as commonly understood by those skilled in the art to which the present disclosure belongs. Furthermore, terms, such as terms defined in commonly used dictionaries, should be interpreted as having a meaning consistent with the meaning in the context of the related technology and should not be interpreted in ideal or overly formal meanings unless explicitly defined herein.

The inspection device and/or any other relevant devices or components according to embodiments of the present disclosure described herein may be implemented utilizing any suitable hardware, firmware (e.g., an application-specific integrated circuit), software, and/or a suitable combination of software, firmware, and hardware. For example, the various components of the inspection device may be formed on one integrated circuit (IC) chip or on separate IC chips. Further, the various components of the inspection device may be implemented on a flexible printed circuit film, a tape carrier package (TCP), a printed circuit board (PCB), or formed on a same substrate as the inspection device. Further, the various components of the inspection device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present disclosure.

Hereinafter, embodiments of the present disclosure will be described with reference to drawings.

FIG. 1 is a diagram illustrating an inspection system testing a display panel according to an embodiment of the present disclosure.

Referring to FIG. 1, an inspection system TSYS, according to embodiments of the present disclosure, includes a camera CAM and an inspection device TD. The inspection system TSYS may be configured to inspect a display device DD. A television is illustrated in FIG. 1 as an example of the display device DD, but the present disclosure is not limited thereto. The display device DD may be used in a small and medium-sized electronic device, such as a personal computer, a notebook computer, a kiosk, an automotive navigation unit, a camera, a tablet PC, a smartphone, a personal digital assistant (PDA), a portable multimedia player (PMP), a game console, or a wristwatch-type electronic device, as well as in a large-sized electronic device, such as a television or an outside billboard.

As illustrated in FIG. 1, the camera CAM may capture an image displayed on the display device DD and provide a sensing image signal IM to the inspection device TD.

The inspection device TD is configured to detect, if present, a pixel that is defective (also referred to herein as a defective pixel) from among the plurality of pixels of the display device DD based on the sensing image signal IM received from the camera CAM and generates a compensation signal CP_S associated with (e.g., based on or in response to) the defective pixel. The compensation signal CP_S may be provided to the display device DD. The display device DD may correct (e.g., may modify) an input image signal based on the compensation signal CP_S and may display an image corresponding to (e.g., based on or according to) the corrected image signal.

Figure 2A:
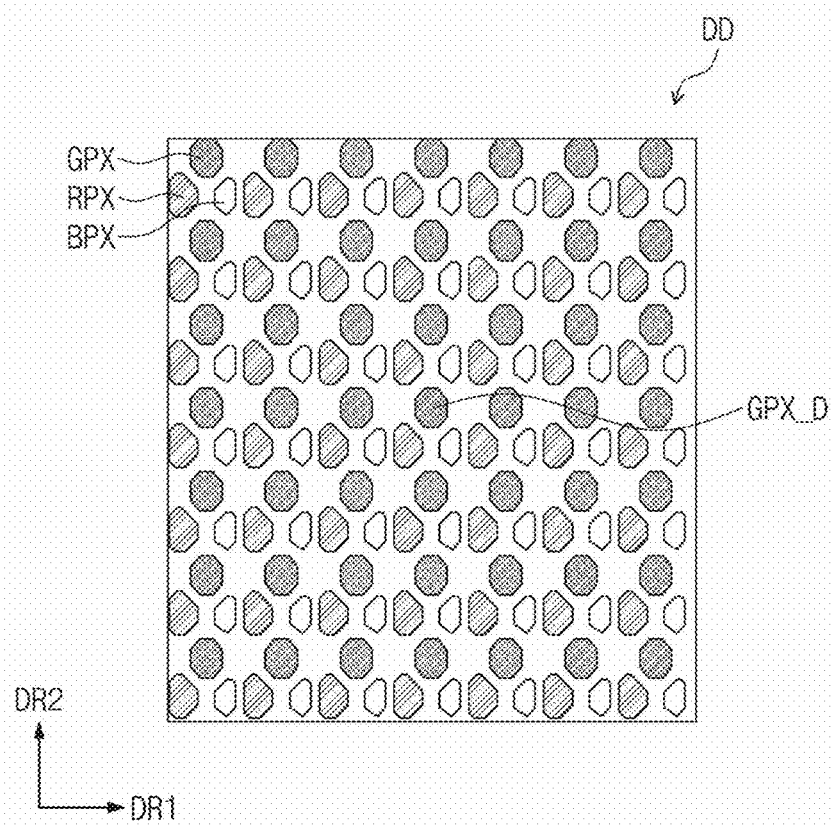
FIG. 2A is a schematic illustration of a first color pixel, a second color pixel, and a third color pixel of a display device.
Figure 2B:
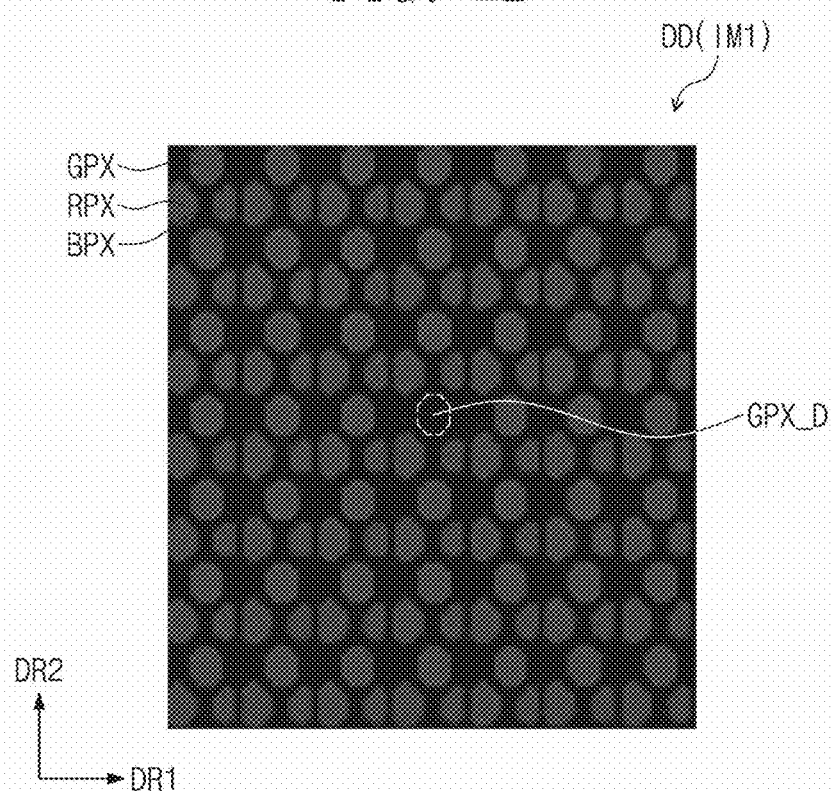
FIG. 2B is an enlarged view of a portion of a display device displaying an image.

FIG. 2A is an illustration of a first color pixel GPX, a second color pixel RPX, and a third color pixel BPX of a display device. FIG. 2B is an enlarged view of a portion of the display device DD displaying an image IM1.

Referring to FIGS. 1, 2A, and 2B, the display device DD displays an image on a surface defined by a first direction DR1 and a second direction DR2. The first direction DR1 and the second direction DR2 may cross each other.

The display device DD includes the plurality pixels. In an embodiment, the display device DD may include the first color pixel GPX, the second color pixel RPX, and the third color pixel BPX. In an embodiment, the first color pixel GPX, the second color pixel RPX, and the third color pixel BPX may emit a green light, a red light, and a blue light, respectively. However, the present disclosure is not limited thereto. The color of the light emitted by each of the first color pixel GPX, the second color pixel RPX, and the third color pixel BPX may be variously changed or modified.

An example in which the first color pixel GPX emitting the green light is a defective pixel GPX_D is illustrated in FIGS. 2A and 2B. The defective pixel GPX_D is a pixel that fails to emit a light. That is, in the image IM1 displayed on the display device DD, a position at where the defective pixel GPX_D is located may be expressed (e.g., may be visible to a user) as a dark point or a dark spot. Alternatively or additionally, in the image IM1 displayed on the display device DD, a color of a region including the defective pixel GPX_D may be expressed as an unintended color.

The size of each of the first color pixel GPX, the second color pixel RPX, and the third color pixel BPX illustrated in FIGS. 2A and 2B and the placement of the first color pixel GPX, the second color pixel RPX, and the third color pixel BPX are provided only as an example, and the present disclosure is not limited thereto.

Figure 3:
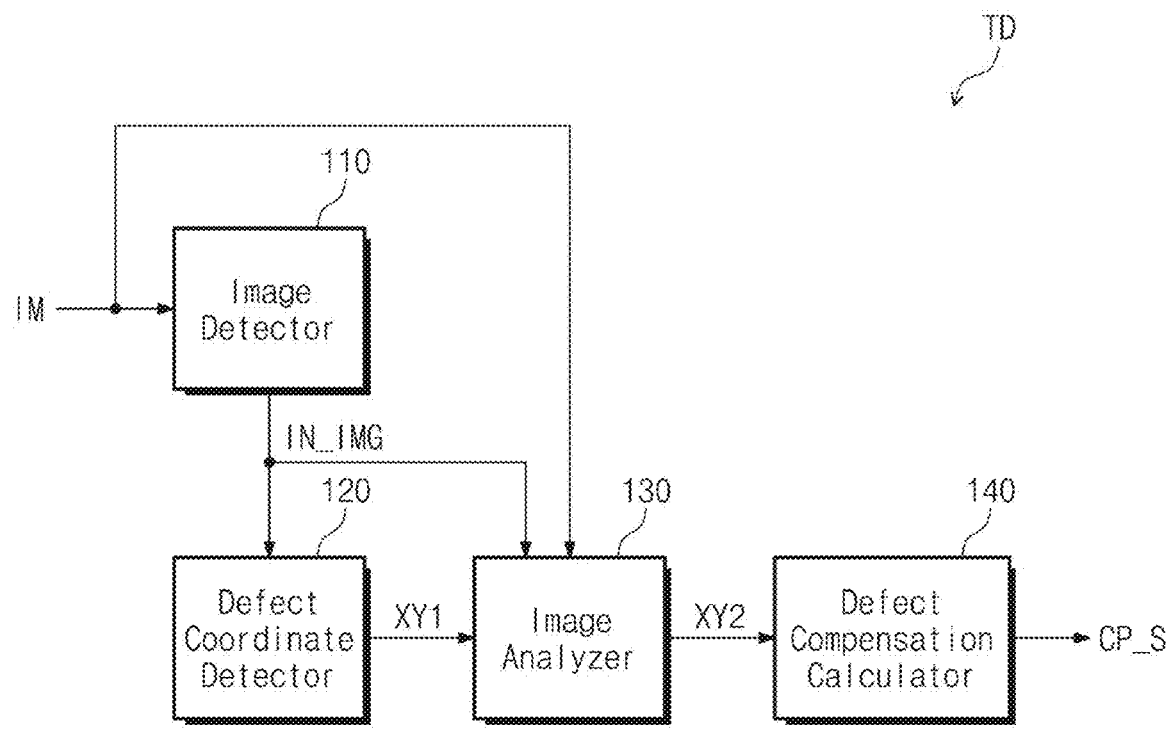
FIG. 3 is a block diagram describing an inspection device according to an embodiment of the present disclosure.

FIG. 3 is a block diagram describing an inspection device according to an embodiment.

Referring to FIG. 3, the inspection device TD, according to embodiments of the present disclosure, includes an image detector 110, a defect coordinate detector 120, an image analyzer 130, and a defect compensation calculator 140.

The image detector 110 converts the sensing image signal IM provided from the camera CAM (see, e.g., FIG. 1) into a sensing input signal IN_IMG. In an embodiment, the sensing input signal IN_IMG may be a digital signal corresponding to a luminance level of the sensing image signal IM.

The defect coordinate detector 120 detects the defective pixel GPX_D (see, e.g., FIG. 2) based on the sensing input signal IN_IMG. The defect coordinate detector 120 may output defect coordinates XY1 indicating the position of the defective pixel GPX_D.

In an embodiment, the defect coordinate detector 120 may output, as the defect coordinates XY1 of the defective pixel GPX_D, coordinates at where the luminance level of the sensing input signal IN_IMG is smaller than or equal to a reference level.

The image detector 110 and the defect coordinate detector 120 are illustrated in FIG. 3 as being independent of each other, but the present disclosure is not limited thereto. In an embodiment, the image detector 110 may be implemented to include the function of the defect coordinate detector 120. When the image detector 110 includes the function of the defect coordinate detector 120, the image detector 110 may convert the sensing image signal IM into the sensing input signal IN_IMG and may output the defect coordinates XY1 of the defective pixel GPX_D (see, e.g., FIG. 2).

The image analyzer 130 determines the consistency of the defect coordinates XY1 based on the sensing image signal IM and the sensing input signal IN_IMG. When the defect coordinates XY1 coincide with the coordinates of the defective pixel GPX_D, the image analyzer 130 outputs the defect coordinates XY1 as final coordinates XY2. When the defect coordinates XY1 does not coincide with the coordinates of the defective pixel GPX_D, the image analyzer 130 outputs new coordinates as the final coordinates XY2.

The defect compensation calculator 140 outputs the compensation signal CP_S for compensating for the luminance of the defective pixel GPX_D based on the final coordinates XY2. In an embodiment, the compensation signal CP_S may include a compensation signal for compensation pixels adjacent to the defective pixel GPX_D. For example, the compensation signal CP_S may include signals for adjusting the luminance of each compensation pixel adjacent to the defective pixel GPX_D.

Figure 4:
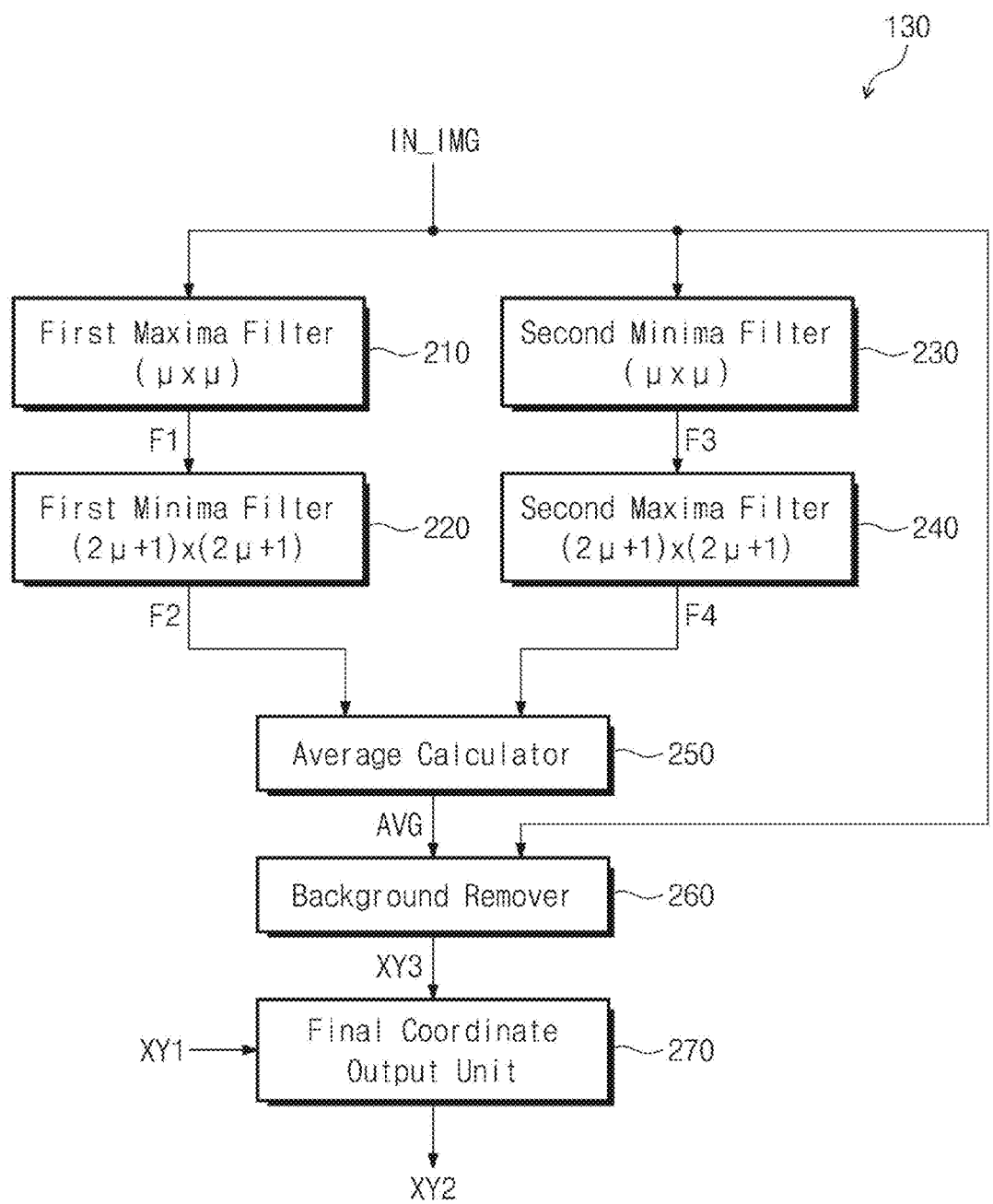
FIG. 4 is a block diagram describing a configuration of an image analyzer illustrated in FIG. 3.
Figure 5A:
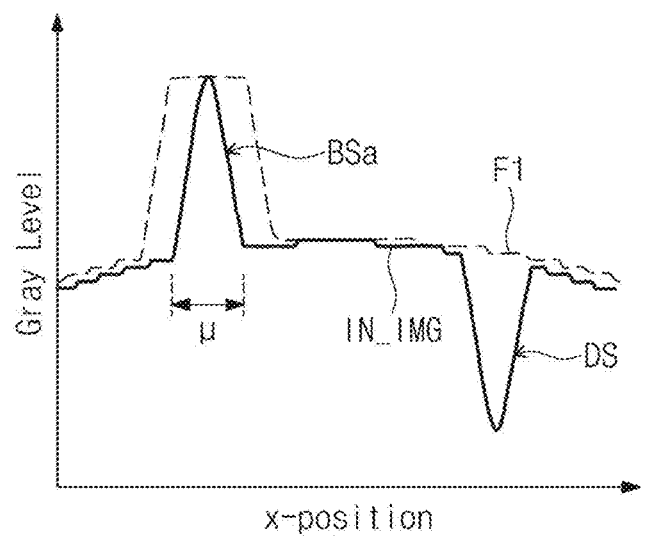
FIG. 5A is a diagram describing an operation of a first maxima filter.
Figure 5B:
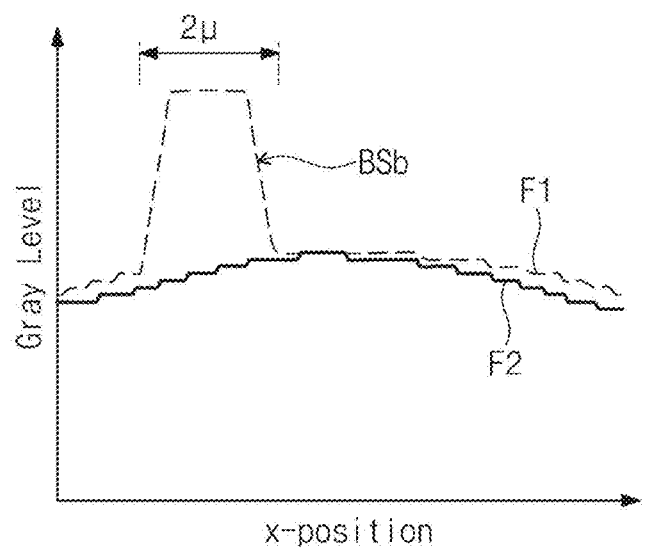
FIG. 5B is a diagram describing an operation of a first minima filter.

FIG. 4 is a block diagram describing a configuration of the image analyzer 130 illustrated in FIG. 3. FIG. 5A is graph describing an operation of a first maxima filter. FIG. 5B is a graph describing an operation of a first minima filter.

Referring to FIG. 4, the image analyzer 130 includes a first maxima filter 210, a first minima filter 220, a second minima filter 230, a second maxima filter 240, an average calculator 250, a background remover 260, and a final coordinate output unit 270.

The image analyzer 130 may include a morphology filter. The morphology filter may be implemented with the first maxima filter 210, the first minima filter 220, the second minima filter 230, and the second maxima filter 240.

As illustrated in FIGS. 4 and 5A, the first maxima filter 210 may output a first filtering signal F1 in which a dark portion DS of the sensing input signal IN_IMG is removed by a dilatation operation.

As illustrated in FIGS. 4 and 5B, the first minima filter 220 may output a second filtering signal F2 in which a bright portion BSb of the first filtering signal F1 is removed by an erosion operation.

The size of the first maxima filter 210 may be "$\mu \times \mu$", and the size of the first minima filter 220 may be "$(2\mu+1) \times (2\mu+1)$".

The second minima filter 230 may output a third filtering signal F3 in which a bright portion BSa (see, e.g., FIG. 5A) of the sensing input signal IN_IMG is removed by the erosion operation.

The second maxima filter 240 may output a fourth filtering signal F4 in which a dark portion DS (see, e.g., FIG. 5B) of the third filtering signal F3 is removed by the dilatation operation.

The size of the second minima filter 230 may be "$\mu \times \mu$", and the size of the second maxima filter 240 may be "$(2\mu+1) \times (2\mu+1)$".

That is, the second filtering signal F2 is a signal obtained by performing maxima filtering on the sensing input signal IN_IMG and then performing minima filtering on a maxima filtering result. The fourth filtering signal F4 is a signal obtained by performing minima filtering on the sensing input signal IN_IMG and then performing maxima filtering on a minima filtering result.

Through the first maxima filter 210, the first minima filter 220, the second minima filter 230, and the second maxima filter 240, the second filtering signal F2 and the fourth filtering signal F4 in which the noises of the sensing input signal IN_IMG are removed may be output.

Through the first maxima filter 210, the first minima filter 220, the second minima filter 230, and the second maxima filter 240, a noise component included in the sensing input signal IN_IMG, a minute stain (or spot) whose size is u or less may be removed.

The average calculator 250 calculates an average AVG of the sensing input signal IN_IMG based on the second filtering signal F2 and the fourth filtering signal F4.

In an embodiment, the image analyzer 130 may include the first maxima filter 210 and the first minima filter 220 and may not include the second minima filter 230 and the second maxima filter 240. In such an embodiment, the average calculator 250 calculates the average AVG of the sensing input signal IN_IMG based on the second filtering signal F2.

The background remover 260 removes a background image from the sensing input signal IN_IMG based on the average AVG calculated by the average calculator 250. The background remover 260 may remove the background image from the sensing input signal IN_IMG by calculating a difference between the sensing input signal IN_IMG and the average AVG.

The background remover 260 may calculate a standard deviation of the sensing input signal IN_IMG based on the difference between the sensing input signal IN_IMG and the average AVG. The background remover 260 may set (or may determine) a reference value based on the average AVG and the standard deviation. When a difference value between the sensing input signal IN_IMG and the average AVG is greater than the reference value, the background remover 260 may determine a pixel corresponding to the sensing input signal IN_IMG as the defective pixel GPX_D (see, e.g., FIG. 2B).

The background remover 260 outputs the coordinates of the defective pixel GPX_D as calculated defect coordinates XY3.

The final coordinate output unit 270 compares the defect coordinates XY1 provided from the defect coordinate detector 120 (see, e.g., FIG. 3) with the calculated defect coordinates XY3 provided from the background remover 260. When the defect coordinates XY1 and the calculated defect coordinates XY3 are identical or substantially identical, the final coordinate output unit 270 outputs either the defect coordinates XY1 or the calculated defect coordinates XY3 as the final coordinates XY2. When the defect coordinates XY1 and the defect coordinates XY3 are different or are substantially different from each other, the final coordinate output unit 270 outputs the calculated defect coordinates XY3 as the final coordinates XY2.

FIGS. 6A, 6B, 7A, 7B, 8A, 8B, and 9 are illustrations and diagrams for describing an operation of the image analyzer 130 illustrated in FIG. 3.

Referring to FIGS. 1 and 6A, the inspection system TSYS may allow (or may cause) an inspection image T_IM1 to be displayed on the display device DD. In another embodiment, the display device DD may display the inspection image T_IM1 in advance of an inspection process.

When all nine first color pixels GPX are normal, the inspection image T_IM1 may be displayed on the display device DD.

The camera CAM may provide the inspection device TD with the sensing image signal IM corresponding to the inspection image T_IM1.

The image analyzer 130 of the inspection device TD may analyze the sensing image signal IM and may determine whether or not the defect coordinates XY1 is appropriate by using a first filter FT1 illustrated in FIG. 6B.

Figure 7A:
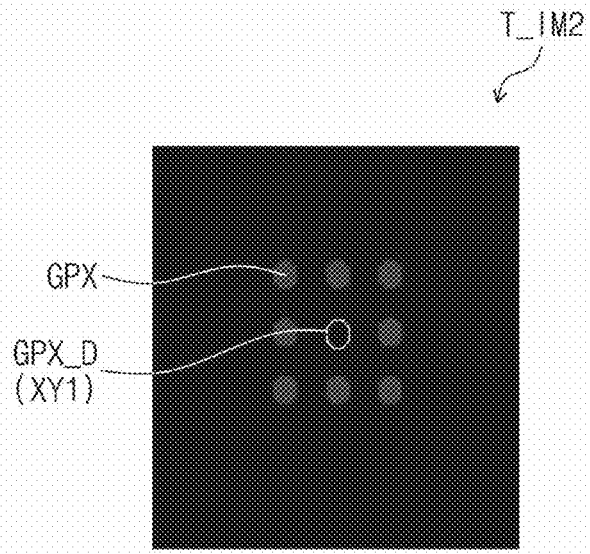
FIG. 7A is an illustration of an image displayed on a display device.
Figure 7B:
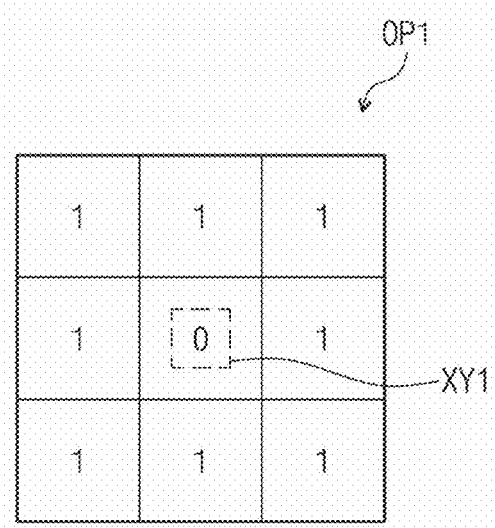
FIG. 7B is an illustration of an operation result of an image analyzer.

FIG. 7A shows an image T_IM2 displayed on the display device DD when the display device DD includes the defective pixel GPX_D.

As illustrated in FIG. 7A, a green light is not emitted at a position of the defective pixel GPX_D in the display device DD.

The image analyzer 130 filters the sensing image signal IM by using the first filter FT1 shown in FIG. 6B and compares the sensing image signal IM experiencing the filtering with a threshold value. When the sensing image signal IM is greater than the threshold value, an operation result OP1 is "1". When the sensing image signal IM is smaller than or equal to the threshold value, the operation result OP1 is "0".

The first filter FT1 illustrated in FIG. 6B has the 3×3 size, a value of a center position is −16, and values of each of the remaining 8 positions is "1". The size of the first filter FT1 illustrated in FIG. 6B and the value of each of the 9 positions thereof are provided only as an example, and the present disclosure is not limited thereto.

In an embodiment, the operation result OP1 corresponding to the defect-free pixel (i.e., normal pixel) may be "1", and the operation result OP1 corresponding to the defect coordinates XY1 of the defective pixel GPX_D may be "0" because the luminance level of the sensing input signal IN_IMG corresponding to the defective pixel GPX_D is low.

When the coordinates at where the operation result OP1 "0" are the same as the defect coordinates XY1 provided from the defect coordinate detector 120, the image analyzer 130 may output the defect coordinates XY1 as the final coordinates XY2.

Figure 8A:
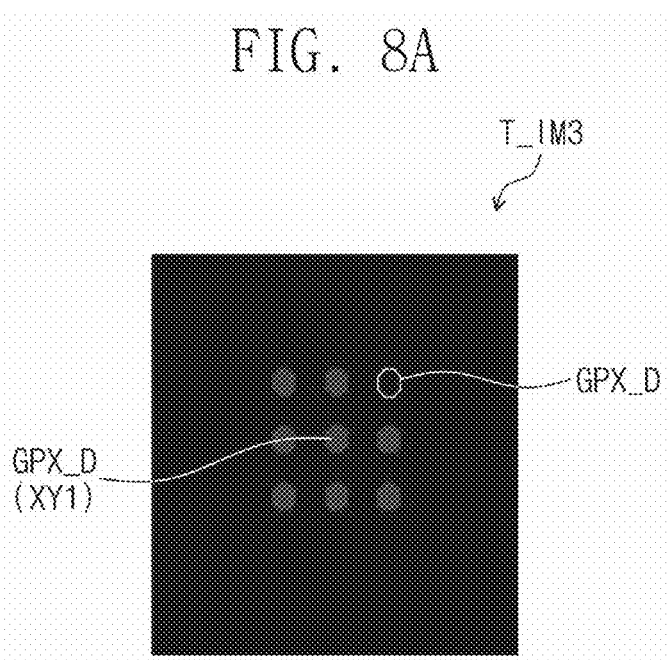
FIG. 8A is an illustration of an image displayed on a display device when the display device includes a defective pixel.
Figure 8B:
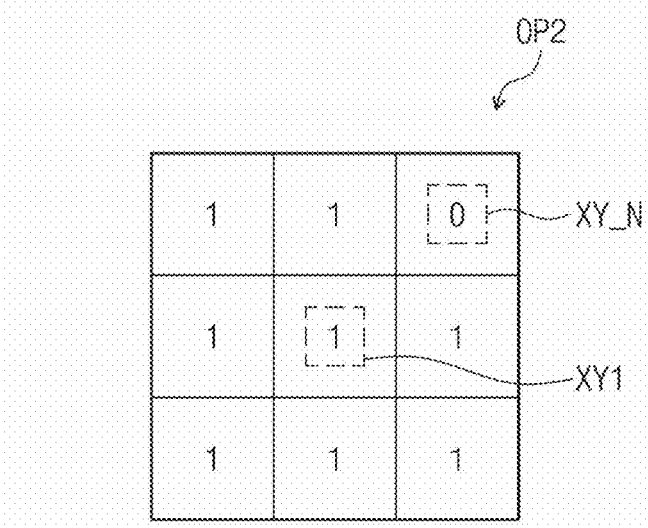
FIG. 8B is an illustration of an operation result of an image analyzer.

FIG. 8A shows an image T_IM3 displayed on the display device DD when the display device DD includes the defective pixel GPX_D.

Due to various reasons, the defect coordinates XY1 that the defect coordinate detector 120 provides (or outputs) may indicate the first color pixel GPX that is not defective. In this case, when filtering is performed by using the first filter FT1 illustrated in FIG. 6B, the image analyzer 130 may output an operation result OP2 illustrated in FIG. 8B.

When new coordinates XY_N at where the operation result OP2 "0" are different from the defect coordinates XY1 provided from the defect coordinate detector 120, the image analyzer 130 may output the new coordinates XY_N as the final coordinates XY2.

Figure 9:
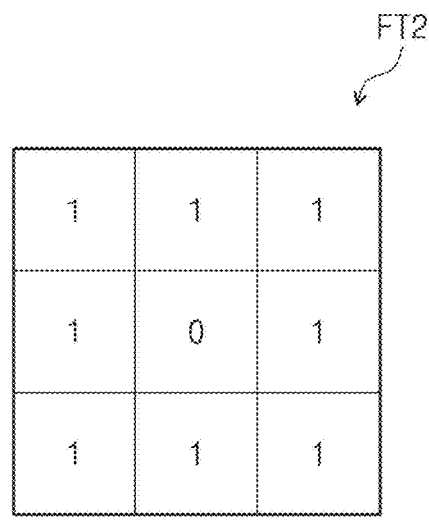
FIG. 9 is an illustration of a second filter used by an image analyzer.

FIG. 9 shows a second filter FT2 used by the image analyzer 130.

Referring to FIGS. 3 and 9, the image analyzer 130 may check (or may determine) the consistency of the defect coordinates XY1 provided from the defect coordinate detector 120 by using the first filter FT1 illustrated in FIG. 6B; afterwards, by using the second filter FT2, the image analyzer 130 may again check (or may again determine) the consistency of the defect coordinates XY1 or may check the consistency of the new coordinates XY_N.

The second filter FT2 has the 3×3 size, a value of a center position is 0, and values of each of the remaining 8 positions is "1".

The image analyzer 130 may align the center position of the second filter FT2 to the defect coordinates XY1 of the sensing image signal IM, which are detected by the defect coordinate detector 120, or to the new coordinates XY_N of the sensing image signal IM.

Under the condition that the sensing image signal IM is filtered by using the second filter FT2, when an operation result of 8 positions corresponding to "1" from among the 9 positions of the second filter FT2 is "1", the image analyzer 130 may output one coordinate, which is selected by the scheme described with reference to FIGS. 6A, 6B, 7A, 7B, 8A, and 8B, from among the defect coordinates XY1 and the new coordinates XY_N as the final coordinates XY2.

Figure 10:
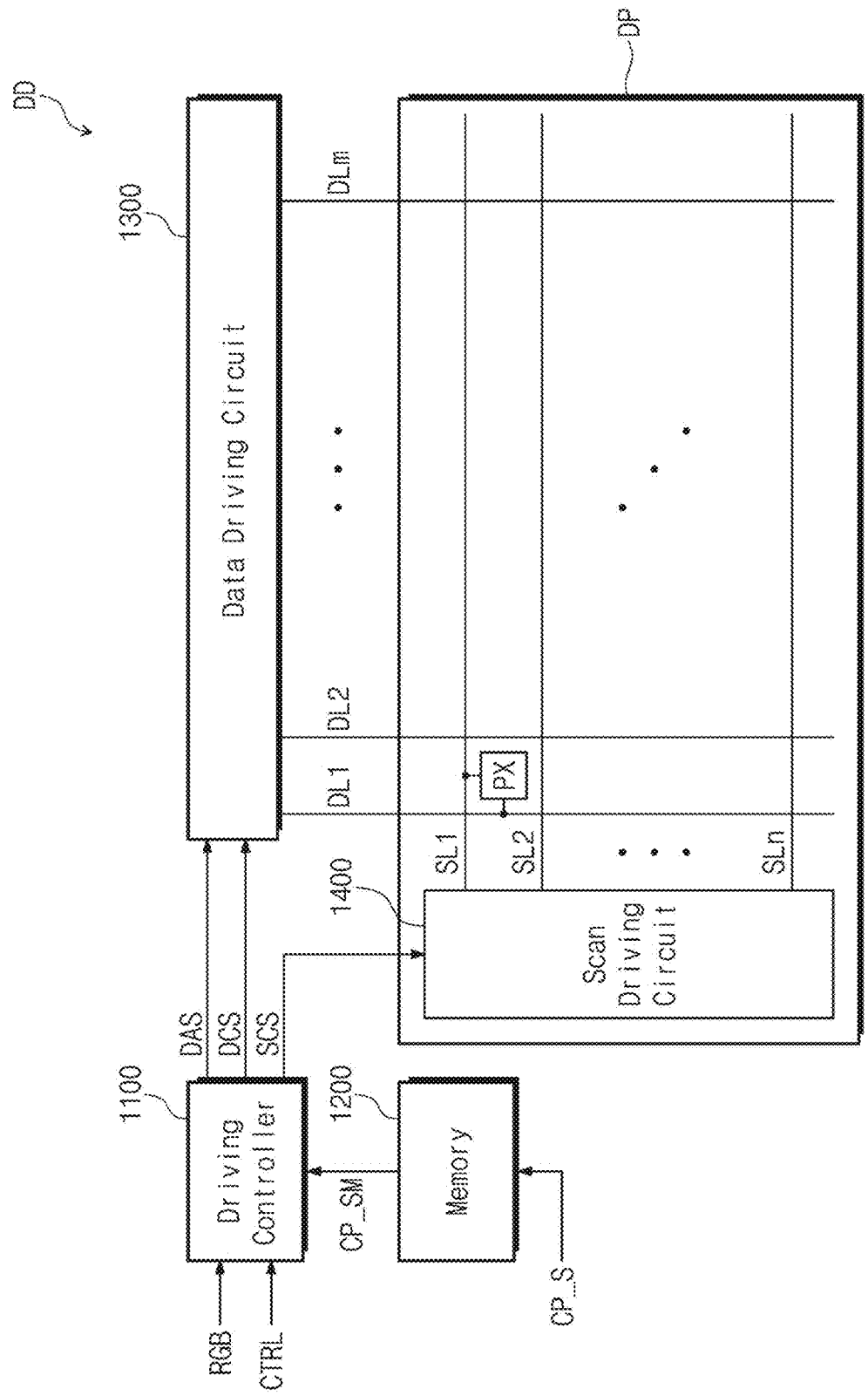
FIG. 10 is a schematic illustration of a display device according to an embodiment of the present disclosure.

FIG. 10 illustrates the display device DD according to an embodiment of the present disclosure.

Referring to FIG. 10, the display device DD includes a display panel DP, a driving controller 1100, a memory 1200, a data driving circuit 1300, and a scan driving circuit 1400.

The display panel DP includes a plurality of pixels PX, a plurality of data lines DL1 to DLm, and a plurality of scan lines SL1 to SLn. Each of the plurality of pixels PX is connected to a relevant one of the plurality of data lines DL1 to DLm and is connected to a relevant one of the plurality of scan lines SL1 to SLn.

The display panel DP, which is a panel for displaying an image, may be one of various kinds of display panels, such as a liquid crystal display (LCD) panel, an electrophoretic display panel, an organic light emitting diode (OLED) panel, a light emitting diode (LED) panel, an electro luminescent display panel, a field emission display (FED) panel, a surface-conduction electron-emitter display (SED) panel, a plasma display panel (PDP), a cathode ray tube (CRT) display panel, etc.

The driving controller 1100 receives an input image signal RGB and a control signal CTRL from the outside. For example, the control signal CTRL may include at least one synchronization signal and at least one clock signal. The driving controller 1100 provides the data driving circuit 1300 with an image data signal DAS that is obtained by processing the input image signal RGB to be appropriate for an operation condition of the display panel DP. In response to the control signal CTRL, the driving controller 1100 provides a first control signal DCS to the data driving circuit 1300 and provides a second control signal SCS to the scan driving circuit 1400. The first control signal DCS may include a horizontal synchronization start signal, a clock signal, and a line latch signal, and the second control signal SCS may include a vertical synchronization start signal and an output enable signal.

The data driving circuit 1300 may output grayscale voltages for driving the plurality of data lines DL1 to DLm in response to the first control signal DCS and the image data signal DAS from the driving controller 1100. In an embodiment, the data driving circuit 1300 may be implemented as an integrated circuit (IC) and may be directly mounted in an area of the display panel DP. In another embodiment, the data driving circuit 1300 may be mounted on a separate printed circuit board in a chip on film (COF) scheme and electrically connected to the display panel DP. In another embodiment, the data driving circuit 1300 may be formed on the display panel DP by using the same process as a driving circuit of each pixel PX.

The scan driving circuit 1400 drives the plurality of scan lines SL1 to SLn in response to the second control signal SCS from the driving controller 1100. In an embodiment, the scan driving circuit 1400 may be formed on the display panel DP by using the same process as a driving circuit of each pixel PX, but the present disclosure is not limited thereto. For example, the scan driving circuit 1400 may be implemented as an integrated circuit (IC), and for the electrical connection with the display panel DP, the integrated circuit may be directly mounted in an area of the display panel DP or may be mounted on a separate printed circuit board in a chip on film (COF) scheme.

The memory 1200 stores the compensation signal CP_S. The compensation signal CP_S stored in the memory 1200 may be provided from the inspection device TD illustrated in FIG. 3.

The driving controller 1100 receives a compensation signal CP_SM from the memory 1200. The compensation signal CP_S stored in the memory 1200 may be substantially the same as the compensation signal CP_SM provided from the memory 1200 to the driving controller 1100.

The driving controller 1100 may provide the data driving circuit 1300 with the image data signal DAS obtained by processing the input image signal RGB from the outside based on the compensation signal CP_SM such that the luminance of each compensation pixel adjacent to a defective pixel is adjusted.

FIG. 11 is an enlarged view of a portion of the display device DD displaying an image IM2 according to an embodiment of the present disclosure.

Referring to FIGS. 3, 10, and 11, the compensation signal CP_S that is stored in the memory 1200 after being provided from the inspection device TD includes a compensation value for increasing the luminance level of compensation pixels GPX_C1, GPX_C2, GPX_C3, and GPX_C4 adjacent to the defective pixel GPX_D.

The compensation pixels GPX_C1, GPX_C2, GPX_C3, and GPX_C4 may include at least two pixels adjacent to the defective pixel GPX_D in the first direction DR1 and at least two pixels adjacent to the defective pixel GPX_D in the second direction DR2.

Each of the compensation pixels GPX_C1, GPX_C2, GPX_C3, and GPX_C4 may be selected from pixels emitting a light of the same color as the defective pixel GPX_D.

The driving controller 1100 may correct the input image signal RGB based on the compensation signal CP_SM from the memory 1200 such that the luminance level of the compensation pixels GPX_C1, GPX_C2, GPX_C3, and GPX_C4 adjacent to the defective pixel GPX_D increases and, thus, may output the image data signal DAS.

Because the defective pixel GPX_D fails to emit a light, emission luminance at a position where the defective pixel GPX_D is disposed decreases (or is relatively low). When the emission luminance of the compensation pixels GPX_C1, GPX_C2, GPX_C3, and GPX_C4 is increased, the decreased luminance of the defective pixel GPX_D may be compensated for by the increased emission luminance of the compensation pixels GPX_C1, GPX_C2, GPX_C3, and GPX_C4.

In an embodiment, when the defective pixel GPX_D emits the green light, some of pixels emitting the green light from among pixels adjacent to the defective pixel GPX_D may be selected as the compensation pixels GPX_C1, GPX_C2, GPX_C3, and GPX_C4.

An example in which the emission luminance of four compensation pixels GPX_C1, GPX_C2, GPX_C3, and GPX_C4 increases is illustrated in FIG. 11, but the present disclosure is not limited thereto. The number and positions of compensation pixels may be variously changed or modified depending on the size, resolution, etc. of the display panel DP.

An example in which the first color pixel GPX (see, e.g., FIG. 2B) is the defective pixel GPX_D is illustrated in FIG. 11, but the present disclosure is not limited thereto. The present disclosure may be identically applied to a case where the second color pixel RPX (see, e.g., FIG. 2B) and the third color pixel BPX (see, e.g., FIG. 2B) are defective pixels.

Figure 12A:
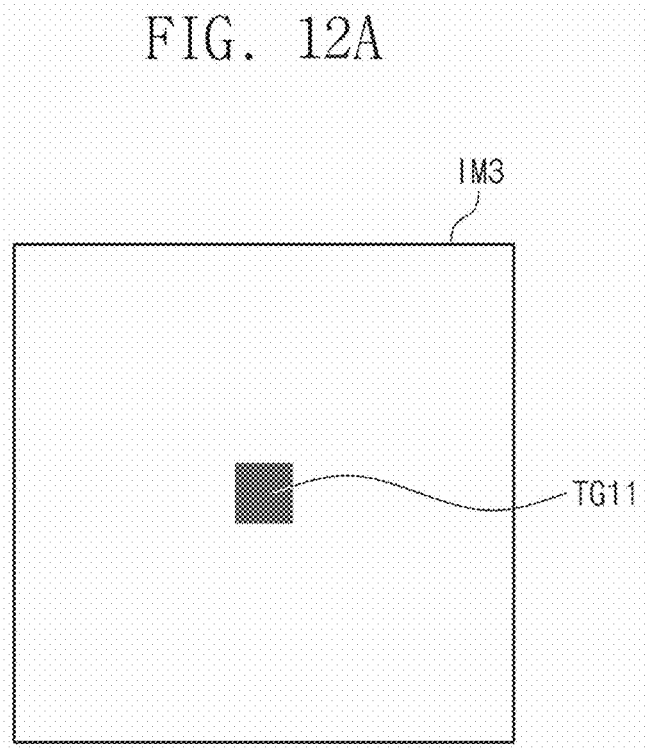
FIG. 12A is an illustration of an image displayed on a display device when a first color pixel is a defective pixel.
Figure 12B:
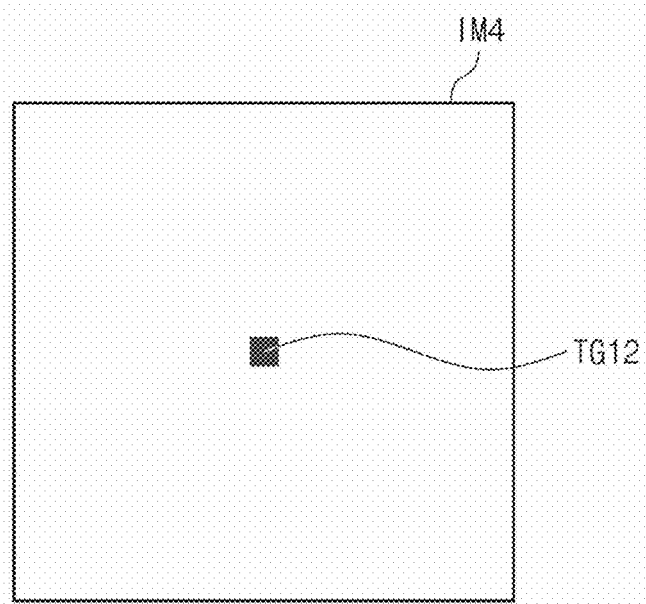
FIG. 12B is an illustration of an image displayed on a display device after luminance compensation is performed in the display device including a defective pixel.

FIG. 12A illustrates an image IM3 displayed on the display device DD when the first color pixel GPX is a defective pixel. FIG. 12B illustrates an image IM4 displayed on the display device DD after luminance compensation is performed in the display device DD including a defective pixel.

Referring to FIG. 12A, the input image signal RGB (see, e.g., FIG. 10) may be a signal for intending to display (e.g., a signal for displaying) an image of a white color in a region TG11. When the region TG11 of the display device DD includes the defective pixel GPX_D (see, e.g., FIG. 11), a magenta color may be displayed in the region TG11 instead of the desired a white color because the defective pixel GPX_D does not emit the green light.

When the display device DD increases the luminance of the compensation pixels GPX_C1, GPX_C2, GPX_C3, and GPX_C4 around the defective pixel GPX_D, as illustrated in FIG. 12B, the size of a region TG12 in which the magenta color is displayed decreases. When the user views an image IM4 at a location distant from the display device DD at a usual distance (e.g., about 60 cm) or more, the user may not perceive the region TG12 in which the magenta color is displayed.

Figure 13A:
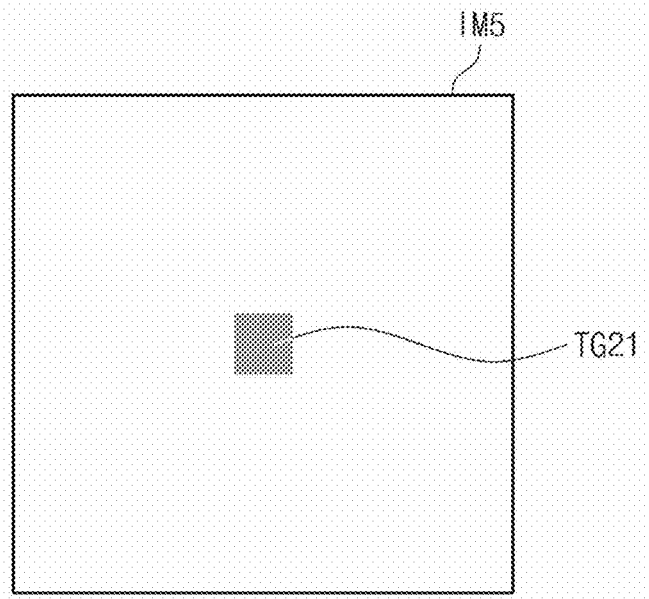
FIG. 13A is an illustration of an image displayed on a display device when a second color pixel is a defective pixel.
Figure 13B:
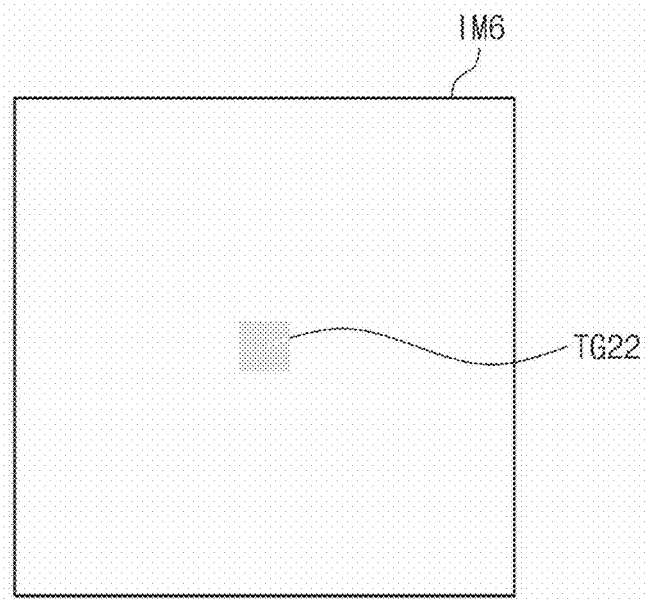
FIG. 13B is an illustration of an image displayed on a display device after luminance compensation is performed in the display device including a defective pixel.

FIG. 13A illustrates an image IM5 displayed on the display device DD when a second color pixel is a defective pixel. FIG. 13B illustrates an image IM6 displayed on the display device DD after luminance compensation is performed in the display device DD including a defective pixel.

Referring to FIG. 13A, the input image signal RGB (see, e.g., FIG. 10) may be a signal for intending to display an image of a white color in a region TG21. When a second color pixel disposed in the region TG21 of the display device DD is a defective pixel, a cyan color may be displayed in the region TG21 instead of a white color because the defective pixel does not emit the red light.

When the display device DD increases the luminance of compensation pixels around the defective pixel, as illustrated in FIG. 13B, the size of a region TG22 in which the cyan color is displayed decreases. When the user views an image IM6 at a location distant from the display device DD at a usual distance (e.g., about 60 cm) or more, the user may not perceive the region TR22 in which the cyan color is displayed.

Figure 14A:
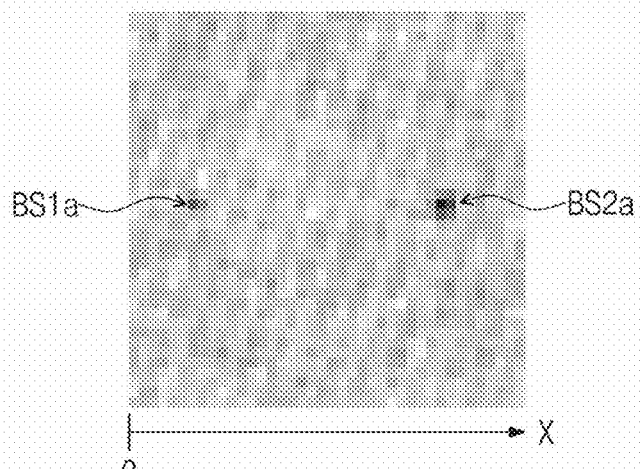
FIGS. 14A, 14B, and 14C are views illustrating a result of visual evaluation of a display device.
Figure 14B:
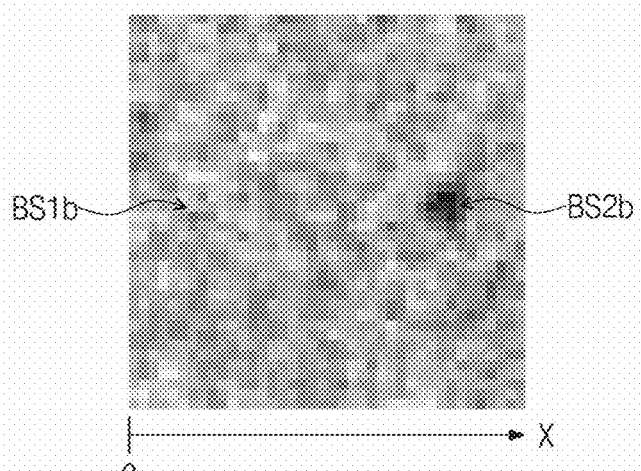
Figure 14C:
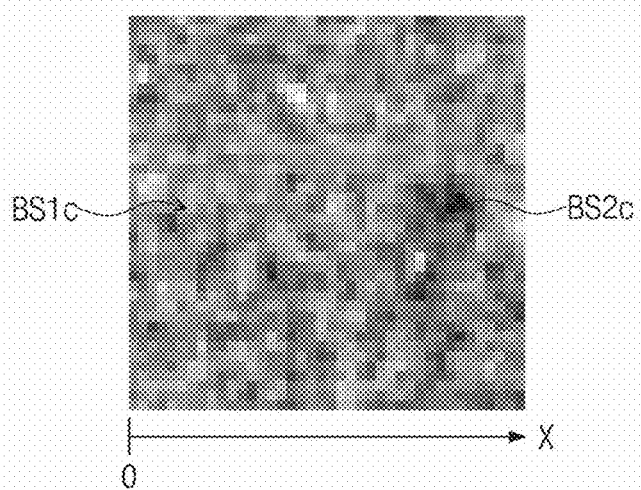
Figure 15:
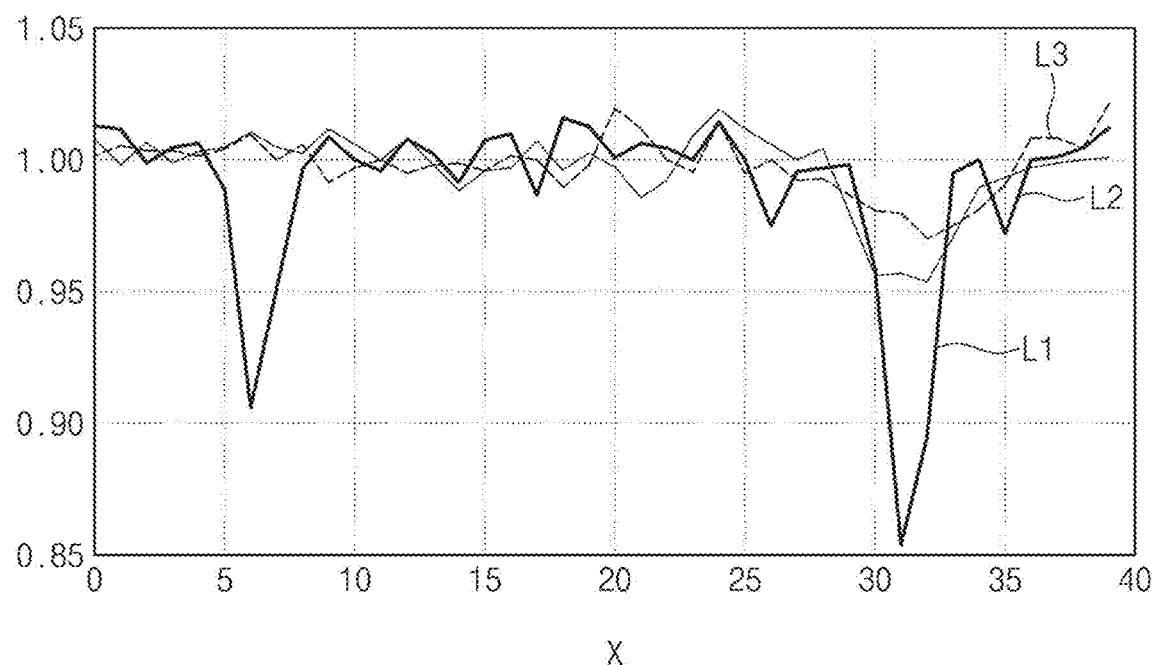
FIG. 15 is a graph show the of visual evaluation of FIGS. 14A, 14B, and 14C.

FIGS. 14A, 14B, and 14C are photographs showing a visual evaluation of the display device DD. FIG. 15 is a graph of the visual evaluation illustrated in FIGS. 14A, 14B, and 14C.

FIG. 14A shows a view that expresses an image visually perceived by the user at a location distant from the display device DD at a first distance (e.g., about 30 cm) when the image is displayed in the display device DD.

FIG. 14B shows a view that expresses an image visually perceived by the user at a location distant from the display device DD at a second distance (e.g., about 60 cm) when the image is displayed in the display device DD.

FIG. 14C shows a view that expresses an image visually perceived by the user at a location distant from the display device DD at a third distance (e.g., about 90 cm) when an image is displayed in the display device DD.

In FIG. 15, the horizontal axis represents an X coordinate of an image illustrated in FIGS. 14A, 14B, and 14C, and the vertical axis represents a normalized gray level of the image illustrated in FIGS. 14A, 14B, and 14C.

In FIG. 15, a first line L1 is a result of normalizing the gray level of the image illustrated in FIG. 14A, a second line L2 is a result of normalizing the gray level of the image illustrated in FIG. 14B, and a third line L3 is a result of normalizing the gray level of the image illustrated in FIG. 14C.

In FIGS. 14A, 14B, and 14C, dark points BS1a, BS1b, and BS1c are points where the defective pixels of the display device DD are compensated for, and dark points BS2a, BS2b, and BS2c are points where the defective pixels of the display device DD are not compensated for.

As illustrated in FIGS. 14A, 14B, 14C, and 15, when the compensation is not performed on the defective pixels of the display device DD, the user may visually perceive the dark points BS2a, BS2b, and BS2c.

When the compensation is performed on the defective pixels of the display device DD, the user may not visually perceive the dark points BS1a, BS1b, and BS1c.

Figure 16:
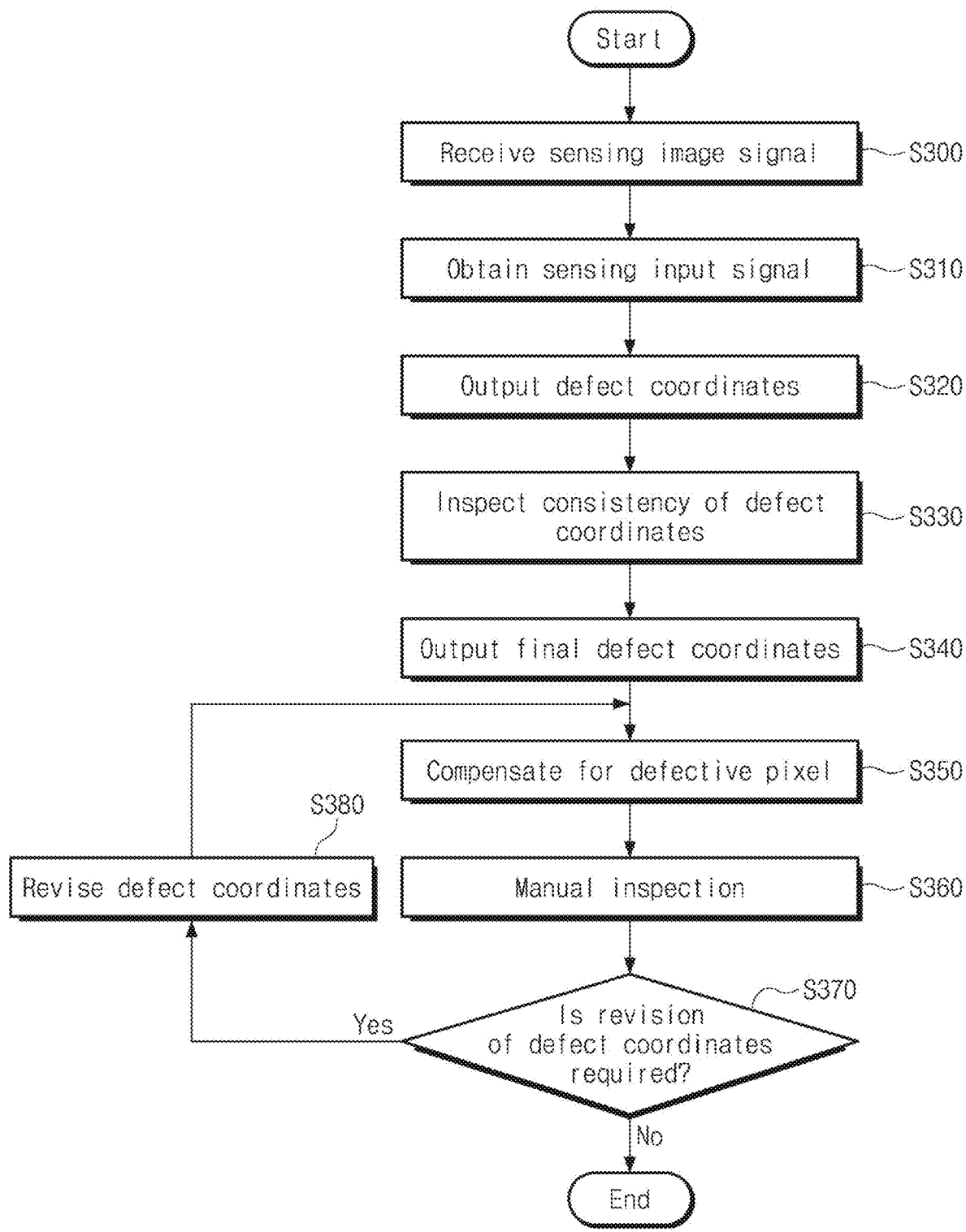
FIG. 16 is a flowchart describing steps of a method for detecting a defective pixel of a display device.

FIG. 16 is a flowchart describing a method for detecting a defective pixel of the display device DD.

Referring to FIGS. 1, 3, and 16, the inspection device TD receives the sensing image signal IM from the camera CAM (S300).

The image detector 110 converts the sensing image signal IM into the sensing input signal IN_IMG (e.g., obtains the sensing input signal IN_IMG) (S310). In an embodiment, the sensing input signal IN_IMG may be a digital signal corresponding to the luminance level of the sensing image signal IM.

The defect coordinate detector 120 detects the defective pixel GPX_D (see, e.g., FIG. 2) based on the sensing input signal IN_IMG. The defect coordinate detector 120 may output the defect coordinates XY1 indicating the position of the defective pixel GPX_D (S320).

The image analyzer 130 determines the consistency of the defect coordinates XY1 based on the sensing image signal IM and the sensing input signal IN_IMG (S330). When the defect coordinates XY1 coincide with the coordinates of the defective pixel GPX_D, the image analyzer 130 outputs the defect coordinates XY1 as the final coordinates XY2 (S340). When the defect coordinates XY1 does not coincide with the coordinates of the defective pixel GPX_D, the image analyzer 130 outputs new coordinates as the final coordinates XY2.

The defect compensation calculator 140 outputs the compensation signal CP_S for compensating for the luminance of the defective pixel GPX_D based on the final coordinates XY2. In an embodiment, the compensation signal CP_S may include signals for increasing the luminance of compensation pixels adjacent to the defective pixel GPX_D.

The compensation signal CP_S may be stored in the memory 1200 of the display device DD illustrated in FIG. 10.

The driving controller 1100 compensates for the luminance of the defective pixel in the input image signal RGB provided from the outside based on the compensation signal CP_SM received from the memory 1200 (S350). The driving controller 1100 may provide the data driving circuit 1300 with the image data signal DAS in which the luminance of the defective pixel is compensated for.

When the image corresponding to the image data signal DAS is displayed in the display panel DP, manual inspection may be performed (S360). The manual inspection refers to defective pixel inspection performed by an operator in the process of manufacturing the display device DD.

When it is determined in the manual inspection (S360) that there is a need to revise defect coordinates (S370), that is, when a dark point is visually perceived by the operator (S370), the operator may revise the defect coordinates (S380). A compensation signal according to the revised defect coordinates may be stored in the memory 1200.

Operation S350, operation S360, operation S370, and operation S380 may be repeatedly performed.

When it is determined in the manual inspection (S360) that there is no need to revise the defect coordinates, the operation for compensating for the defective pixel of the display device DD may end.

Figure 17:
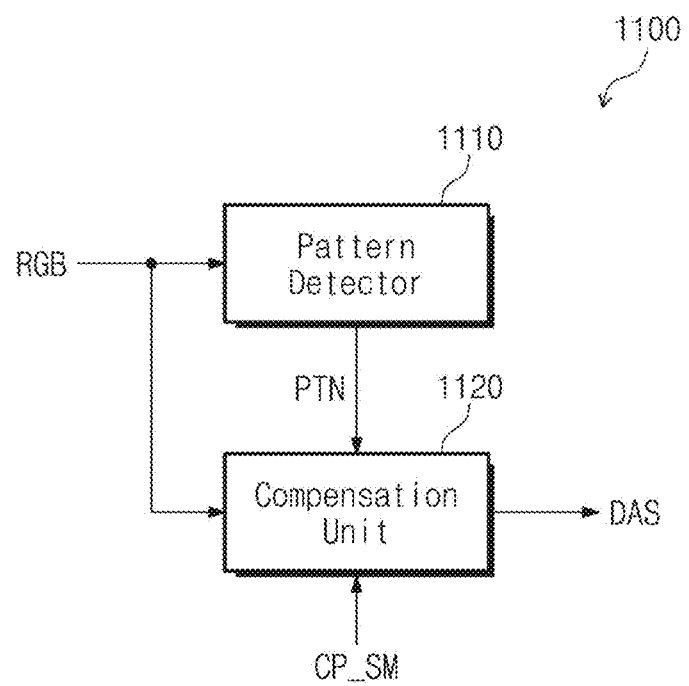
FIG. 17 is a block diagram describing a configuration of a driving controller according to an embodiment of the present disclosure.

FIG. 17 is a block diagram describing a configuration of the driving controller 1100 according to an embodiment of the present disclosure.

Referring to FIG. 17, the driving controller 1100 includes a pattern detector 1110 and a compensation unit 1120.

The pattern detector 1110 detects a pattern of the input image signal RGB and outputs a pattern signal PTN corresponding to the detected pattern.

The compensation unit 1120 compensates for the input image signal RGB based on the pattern signal PTN from the pattern detector 1110 and the compensation signal CP_SM from the memory 1200 and outputs the image data signal DAS. The compensation unit 1120 may determine whether or not to adjust the luminance of compensation pixels in the input image signal RGB, based on the pattern signal PTN.

When there is a need to adjust the luminance of the compensation pixels, the compensation unit 1120 compensates for the input image signal RGB based on the compensation signal CP_SM and outputs the image data signal DAS.

When there is no need to adjust the luminance of the compensation pixels, the compensation unit 1120 may skip luminance adjustment associated with at least a portion of the input image signal RGB based on the pattern signal PTN and the compensation signal CP_SM.

FIGS. 18A, 18B, 19A, and 19B are views describing an operation of the driving controller 1100 illustrated in FIG. 17.

Figure 18A:
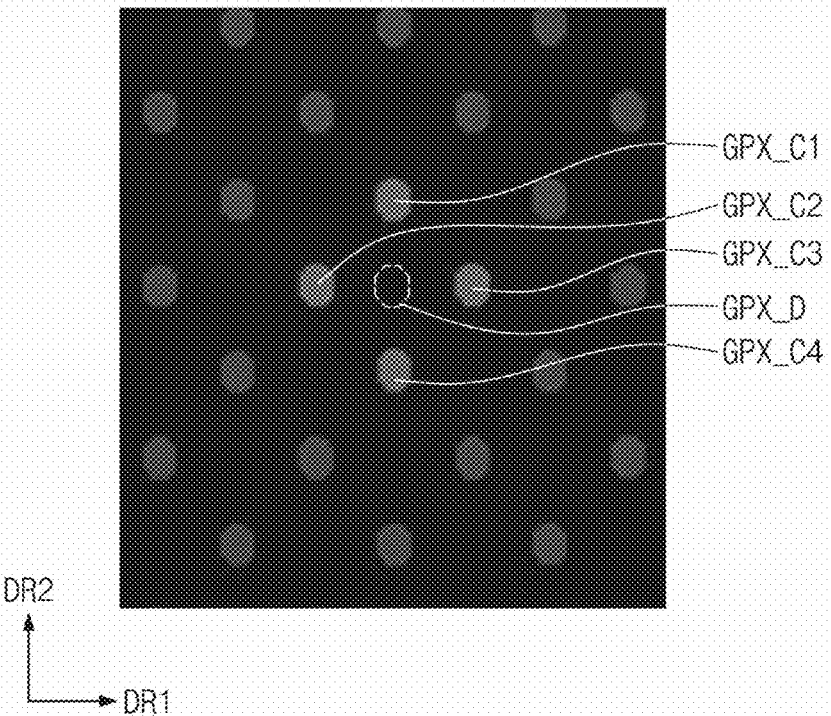
FIGS. 18A, 18B, 19A, and 19B are enlarged views of a portion of a display device displaying an image.

FIG. 18A is an enlarged view of a portion of the display device DD displaying an image IM7.

An example in which a pixel emitting a green light is defective is illustrated in FIG. 18A. The defective pixel GPX_D fails to emit a light. That is, in the image IM7 displayed in the display device DD, a position at where the defective pixel GPX_D is located may be expressed as a dark point.

Because the defective pixel GPX_D fails to emit a light, emission luminance at the position where the defective pixel GPX_D is disposed decreases. When the emission luminance of the compensation pixels GPX_C1, GPX_C2, GPX_C3, and GPX_C4 is increased, the decreased luminance of the defective pixel GPX_D may be compensated for by the increased emission luminance of the compensation pixels GPX_C1, GPX_C2, GPX_C3, and GPX_C4.

In an embodiment, as illustrated in FIG. 18A, the grayscale of the input image signal RGB corresponding to the defective pixel GPX_D may be a black grayscale. In this case, the increase of the emission luminance of the compensation pixels GPX_C1, GPX_C2, GPX_C3, and GPX_C4 may cause the abnormal increase of the luminance around the defective pixel GPX_D, thereby reducing the quality of display of the image IM7.

Figure 18B:
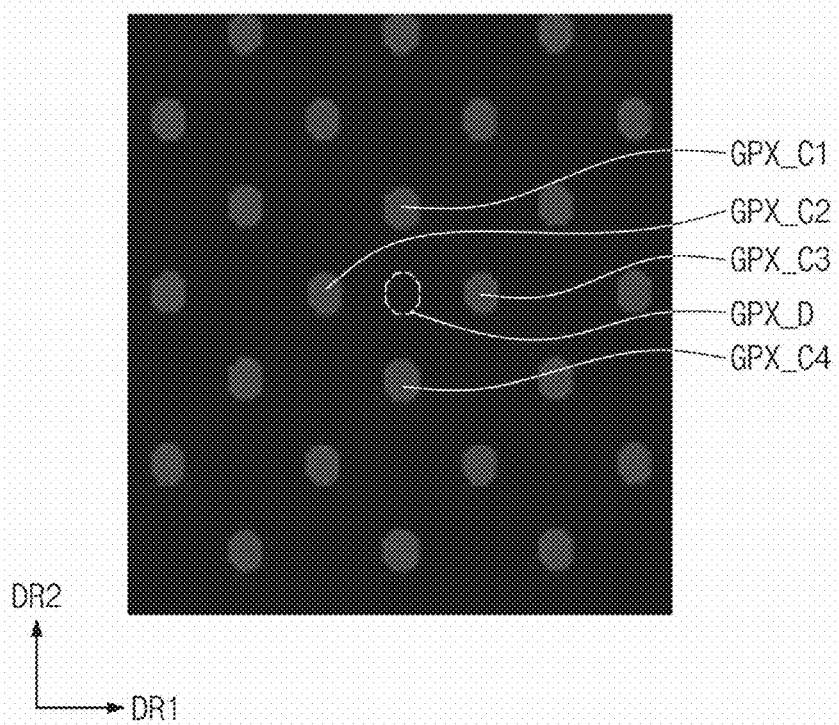

FIG. 18B is an enlarged view of a portion of the display device DD displaying an image IM8.

Referring to FIGS. 17, 18A, and 18B, the pattern detector 1110 determines the pattern of the input image signal RGB. When the input image signal RGB corresponding to the defective pixel GPX_D is of a black grayscale or when the input image signal RGB corresponding to the defective pixel GPX_D is of a specific grayscale not requiring the increase of the emission luminance of the compensation pixels GPX_C1, GPX_C2, GPX_C3, and GPX_C4, the pattern detector 1110 outputs the pattern signal PTN indicating that there is no need to compensate for a defective pixel. In the examples illustrated in FIGS. 18A and 18B, the pattern detector 1110 may output the pattern signal PTN indicating that there is no need to perform defective pixel compensation on the compensation pixels GPX_C1, GPX_C2, GPX_C3, and GPX_C4.

Even though the compensation signal CP_SM from the memory 1200 includes compensation values for increasing the emission luminance of the compensation pixels GPX_C1, GPX_C2, GPX_C3, and GPX_C4, the compensation unit 1120 does not change the emission luminance of the compensation pixels GPX_C1, GPX_C2, GPX_C3, and GPX_C4 in response to the pattern signal PTN. That is, the compensation unit 1120 may skip luminance adjustment associated with the compensation pixels GPX_C1, GPX_C2, GPX_C3, and GPX_C4.

Accordingly, as illustrated in FIG. 18B, the display device DD may display the image IM8 whose display quality is not reduced.

In another embodiment, the compensation unit 1120 may vary a luminance adjustment level of the compensation pixels GPX_C1, GPX_C2, GPX_C3, and GPX_C4. For example, when the compensation signal CP_SM from the memory 1200 is for increasing the luminance level (or gray level) of the compensation pixels GPX_C1, GPX_C2, GPX_C3, and GPX_C4 as much as a 10-level, the compensation unit 1120 may adjust the luminance level of the compensation pixels GPX_C1, GPX_C2, GPX_C3, and GPX_C4 as much as "−10".

For example, when the luminance level (or gray level) of the input image signal RGB associated with the compensation pixels GPX_C1, GPX_C2, GPX_C3, and GPX_C4 is 50, the compensation signal CP_SM from the memory 1200 is for increasing the luminance level as much as "+10", and the adjustment value of the compensation unit 1120 is "−10", the luminance level (or gray level) of the image data signal DAS associated with the compensation pixels GPX_C1, GPX_C2, GPX_C3, and GPX_C4 may be 50 (=50+10−10).

In another embodiment, when the luminance level (or gray level) of the input image signal RGB associated with the compensation pixels GPX_C1, GPX_C2, GPX_C3, and GPX_C4 is 50, the compensation signal CP_SM from the memory 1200 is for increasing the luminance level as much as "+10", and the adjustment value of the compensation unit 1120 is "−5", the luminance level (or gray level) of the image data signal DAS associated with the compensation pixels GPX_C1, GPX_C2, GPX_C3, and GPX_C4 may be 55 (=50+10−5).

Figure 19A:
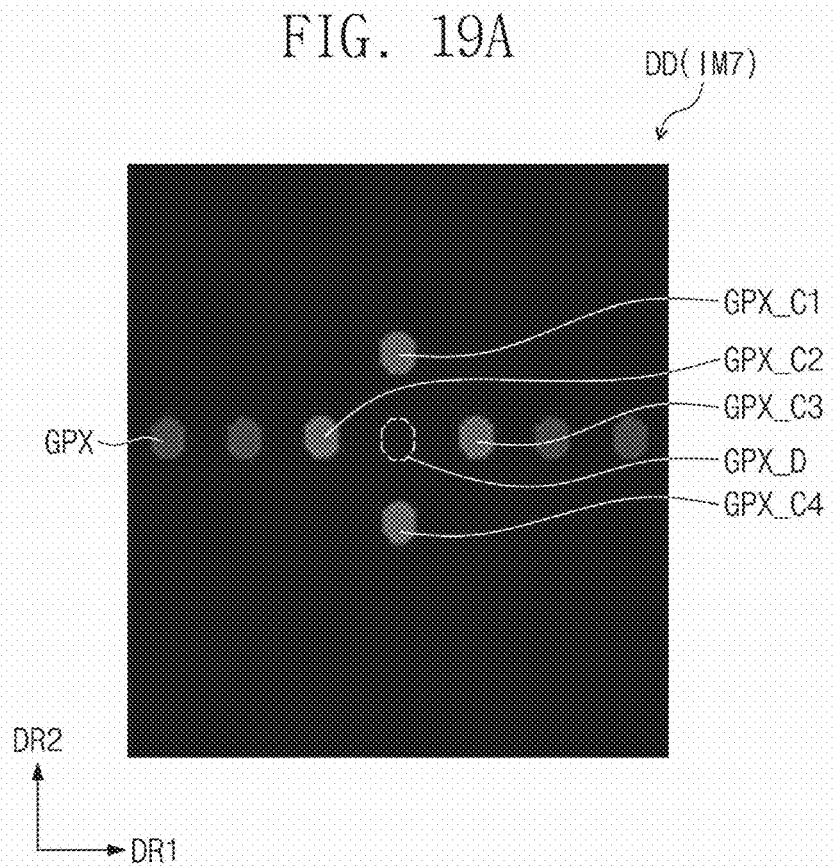

FIG. 19A is an enlarged view of a portion of the display device DD displaying an image IM9.

An example in which a pixel emitting a green light is defective is illustrated in FIG. 19A. In an embodiment, as illustrated in FIG. 19A, the input image signal RGB may include a pattern in which only the first color pixels GPX belonging to a row including the defective pixel GPX_D, that is, only the first color pixels GPX disposed side by side (e.g., arranged adjacent to each other) in the first direction DR1, may emit a light and the remaining pixels do not emit a light.

In this case, the increase of the emission luminance of the compensation pixels GPX_C1 and GPX_C4 may cause the abnormal increase of the luminance around the defective pixel GPX_D, thereby reducing the quality of display of the image IM9.

Figure 19B:
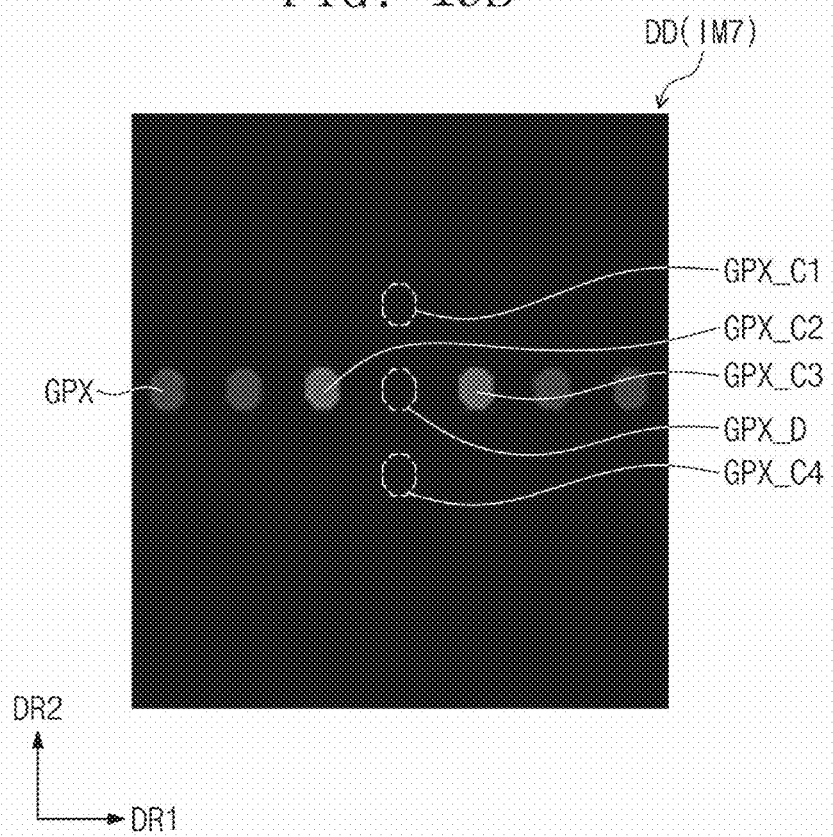

FIG. 19B is an enlarged view of a portion of the display device DD displaying an image IM10.

Referring to FIGS. 17, 19A, and 19B, the pattern detector 1110 determines the pattern of the input image signal RGB. When the input image signal RGB corresponding to at least one of the compensation pixels GPX_C1, GPX_C2, GPX_C3, and GPX_C4 adjacent to the defective pixel GPX_D is of a black grayscale or when the input image signal RGB corresponding to the at least one compensation pixel is of a specific grayscale not requiring the increase of the emission luminance of the compensation pixels GPX_C1, GPX_C2, GPX_C3, and GPX_C4, the pattern detector 1110 outputs the pattern signal PTN indicating that there is no need to compensate for a defective pixel. In the example illustrated in FIG. 19A, because the input image signal RGB corresponding to the compensation pixels GPX_C1 and GPX_C4 is of a black grayscale, the pattern detector 1110 may output the pattern signal PTN indicating that there is no need to perform defective pixel compensation on the compensation pixels GPX_C1 and GPX_C4.

Even though the compensation signal CP_SM from the memory 1200 includes compensation values for increasing the emission luminance of the compensation pixels GPX_C1 and GPX_C4, the compensation unit 1120 does not change the emission luminance of the compensation pixels GPX_C1 and GPX_C4 in response to the pattern signal PTN. That is, the compensation unit 1120 may skip luminance adjustment associated with the compensation pixels GPX_C1 and GPX_C4.

Accordingly, as illustrated in FIG. 19B, the display device DD may display the image IM10 whose display quality is not reduced.

Figure 20:
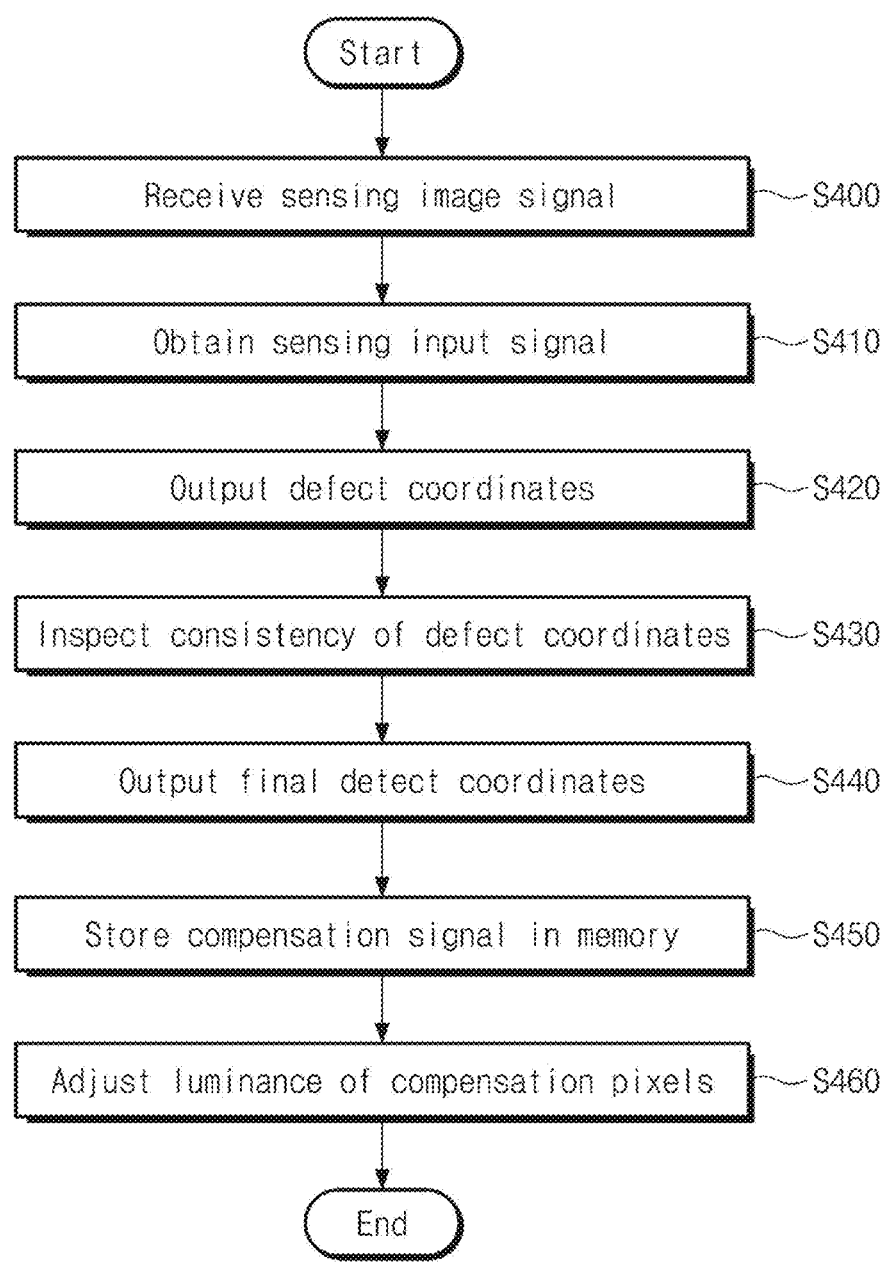
FIG. 20 is a flowchart describing a method for compensating for a defective pixel of a display device.

FIG. 20 is a flowchart describing a method for compensating for a defective pixel of the display device DD.

Operation S400 to operation S430 shown in FIG. 20 are the same as operation S300 to operation S330 shown in FIG. 16, and thus, additional description thereof will be omitted to avoid redundancy.

Referring to FIGS. 1, 3, 17, and 20, the compensation signal CP_S output from the defect coordinate detector 120 may be stored in the memory 1200 of the display device DD illustrated in FIG. 10 (S450).

The driving controller 1100 compensates for the luminance of the defective pixel in the input image signal RGB provided from the outside based on the compensation signal CP_SM received from the memory 1200.

The driving controller 1100 may adjust the luminance of compensation pixels (S460).

The pattern detector 1110 detects a pattern of the input image signal RGB and outputs the pattern signal PTN corresponding to the detected pattern.

The compensation unit 1120 compensates for the input image signal RGB based on the pattern signal PTN from the pattern detector 1110 and the compensation signal CP_SM from the memory 1200 and outputs the image data signal DAS. The compensation unit 1120 may perform luminance adjustment on the compensation pixels in the input image signal RGB based on the pattern signal PTN and the compensation signal CP_SM from the memory 1200.

An inspection system having the above-described configuration may detect a defective pixel from among a plurality of pixels of a display device and may output a compensation signal for adjusting luminance of compensation pixels adjacent to the defective pixel.

The display device may adjust the luminance of the compensation pixels adjacent to the defective pixel to compensate for the reduction of luminance of the defective pixel.

Accordingly, even though the display device includes a defective pixel(s), the user does not visually perceive the defective pixel(s).

While the present disclosure has been described with reference to embodiments thereof, it will be apparent to those of ordinary skill in the art that various changes and modifications may be made thereto without departing from the spirit and scope of the present disclosure as set forth in the following claims and their equivalents.

What is claimed is:

1. An inspection system comprising:
   a camera configured to capture a display device including a plurality of pixels and to provide a sensing image signal; and
   an inspection device configured to receive the sensing image signal and to output a compensation signal for compensating for luminance of a defective pixel from among the plurality of pixels, the inspection device comprises:
   an image detector configured to output a sensing input signal corresponding to the sensing image signal;
   a defect coordinate detector configured to detect the defective pixel based on the sensing input signal and to output defect coordinates indicating a position of the defective pixel;
   an image analyzer configured to analyze consistency of the defect coordinates based on the sensing image signal and the sensing input signal and to output final coordinates; and
   a defect compensation calculator configured to output a compensation signal for adjusting luminance of compensation pixels adjacent to the defective pixel from among the plurality of pixels based on the final coordinates.

2. The inspection system of claim 1, wherein the compensation pixels comprise at least two pixels adjacent to the defective pixel in a first direction from among the plurality of pixels and at least two pixels adjacent to the defective pixel in a second direction from among the plurality of pixels, and
   wherein the first direction and the second direction cross each other.

3. The inspection system of claim 1, wherein the compensation pixels are pixels emitting the same color light as the defective pixel from among the plurality of pixels.

4. The inspection system of claim 1, wherein the image analyzer comprises:

a first maxima filter configured to perform maxima filtering on the sensing input signal and to output a first filtering signal;
a first minima filter configured to perform minima filtering on the first filtering signal and to output a second filtering signal;
an average calculator configured to calculate an average of the sensing input signal based on the second filtering signal;
a background remover configured to remove a background image from the sensing input signal based on the average and to output calculated defect coordinates; and
a final coordinate output unit configured to output either the defect coordinates provided from the defect coordinate detector or the calculated defect coordinates as the final coordinates.

5. The inspection system of claim 4, further comprising:
a second minima filter configured to perform the minima filtering on the sensing input signal and to output a third filtering signal; and
a second maxima filter configured to perform the maxima filtering on the third filter signal and to output a fourth filtering signal,
wherein the average calculator calculates the average of the sensing input signal based on the second filtering signal and the fourth filtering signal.

6. The inspection system of claim 4, wherein the background remover is configured to:
calculate a standard deviation based on a difference value of the sensing input signal and the average;
set a reference value based on the standard deviation; and
in response to the difference value of the sensing input signal and the average being greater than the reference value, output coordinates of a pixel corresponding to the sensing input signal as the calculated defect coordinates.

7. The inspection system of claim 4, wherein, in response to the defect coordinates provided from the defect coordinate detector being equal to the calculated defect coordinates, the final coordinate output unit outputs the defect coordinates as the final coordinates.

8. The inspection system of claim 4, wherein, in response to the defect coordinates provided from the defect coordinate detector being different from the calculated defect coordinates, the final coordinate output unit outputs the calculated defect coordinates as the final coordinates.

9. The inspection system of claim 1, wherein the compensation signal comprises a signal for increasing the luminance of the compensation pixels.

10. A display device comprising:
a display panel comprising a plurality of pixels connected to a plurality of data lines and a plurality of scan lines;
a data driving circuit configured to receive an image data signal and to drive the plurality of data lines;
a scan driving circuit configured to drive the plurality of scan lines;
a memory configured to store a compensation signal for compensation pixels adjacent to a defective pixel from among the plurality of pixels; and
a driving controller configured to receive a control signal and an input image signal and to control the data driving circuit and the scan driving circuit such that an image is displayed on the display panel,
wherein the driving controller is configured to perform luminance adjustment on the input image signal corresponding to the compensation pixels based on the compensation signal and outputs the image data signal,
wherein the driving controller is configured to detect a pattern of the input image signal, and
wherein the driving controller is configured to skip the luminance adjustment associated with at least some of the compensation pixels when the detected pattern is a preset pattern.

11. The display device of claim 10, wherein the driving controller comprises:
a pattern detector configured to detect the pattern of the input image signal and to output a pattern signal; and
a compensation unit configured to perform the luminance adjustment on the compensation pixels based on the pattern signal and the compensation signal and to output the image data signal.

12. The display device of claim 10, wherein, in response to the input image signal corresponding to the defective pixel being of a preset grayscale, the driving controller is configured to skip the luminance adjustment with regard to all the compensation pixels.

13. The display device of claim 10, wherein, in response to the input image signal corresponding to at least one of the compensation pixels being of a preset grayscale, the driving controller is configured to skip the luminance adjustment with regard to the at least one of the compensation pixels.

14. The display device of claim 10, wherein the plurality of pixels comprise a plurality of pixels configured to emit different color light, and
wherein, in response to the defective pixel being configured to emit a first light, the compensation pixels are adjacent pixels to the defective pixel from among pixels configured to emit the first light from among the plurality of pixels.

15. A defective pixel compensation method of a display device, the method comprising:
capturing the display device comprising a plurality of pixels to provide a sensing image signal;
outputting a sensing input signal corresponding to the sensing image signal;
detecting a defective pixel from among the plurality of pixels based on the sensing input signal to output defect coordinates indicating a position of the defective pixel;
analyzing consistency of the defect coordinates based on the sensing image signal and the sensing input signal to output final coordinates;
storing a compensation signal for increasing luminance of compensation pixels adjacent to the defective pixel from among the plurality of pixels based on the final coordinates in a memory of the display device; and
performing luminance adjustment on an input image signal corresponding to the compensation pixels based on the compensation signal stored in the memory to output an image data signal.

16. The method of claim 15, wherein the compensation pixels comprise at least two pixels adjacent to the defective pixel in a first direction from among the plurality of pixels and at least two pixels adjacent to the defective pixel in a second direction from among the plurality of pixels, and
wherein the first direction and the second direction cross each other.

17. The method of claim 15, wherein the compensation pixels are selected from pixels configured to emit the same color light as the defective pixel from among the plurality of pixels.

18. The method of claim 15, wherein the analyzing of the consistency of the defect coordinates based on the sensing image signal and the sensing input signal to output the final coordinates comprises:
  performing maxima filtering on the sensing input signal to output a first filtering signal;
  performing minima filtering on the first filtering signal to output a second filtering signal;
  calculating an average of the sensing input signal based on the second filtering signal;
  removing a background image from the sensing input signal based on the average to output calculated defect coordinates; and
  outputting either the defect coordinates or the calculated defect coordinates as the final coordinates.

19. The method of claim 18, wherein the outputting of either the defect coordinates or the calculated defect coordinates as the final coordinates comprises:
  in response to the defect coordinates being different from the calculated defect coordinates, outputting the calculated defect coordinates as the final coordinates.

20. The method of claim 15, wherein the performing of the luminance adjustment on the input image signal corresponding to the compensation pixels based on the compensation signal stored in the memory to output the image data signal comprises:
  in response to the input image signal corresponding to the defective pixel being of a preset grayscale, skipping the luminance adjustment with regard to all the compensation pixels.

21. The method of claim 15, wherein the performing of the luminance adjustment on the input image signal corresponding to the compensation pixels based on the compensation signal stored in the memory to output the image data signal comprises:
  in response to the input image signal corresponding to at least one of the compensation pixels being of a present grayscale, skipping the luminance adjustment with regard to the at least one of the compensation pixels.

* * * * *